United States Patent [19]
Saito et al.

[11] Patent Number: 5,822,533
[45] Date of Patent: Oct. 13, 1998

[54] INFORMATION TRACING SYSTEM AND INFORMATION TRACING METHOD

[75] Inventors: Kazuo Saito; Juhei Nakagaki, both of Kanagawa; Yasuko Toju, Tokyo; Noriyuki Kamibayashi, Kanagawa, all of Japan

[73] Assignee: Fuji Xerox Co., Ltd., Tokyo, Japan

[21] Appl. No.: 654,051

[22] Filed: May 23, 1996

[30] Foreign Application Priority Data

May 24, 1995 [JP] Japan .................................... 7-125357
Apr. 1, 1996 [JP] Japan .................................... 8-079002

[51] Int. Cl.[6] .................................................. G06F 15/16
[52] U.S. Cl. ................................ 395/200.54; 395/200.68
[58] Field of Search ....................... 395/200.54, 200.68, 395/200.32

[56] References Cited

U.S. PATENT DOCUMENTS

| | | | |
|---|---|---|---|
| 4,373,185 | 2/1983 | Mills et al. | 364/478 |
| 5,072,400 | 12/1991 | Manduley | 364/478 |
| 5,125,075 | 6/1992 | Goodale et al. | 395/200.36 |
| 5,245,532 | 9/1993 | Mourier | 364/400 |
| 5,388,049 | 2/1995 | Sansone et al. | 364/478.115 |
| 5,473,143 | 12/1995 | Vak et al. | 235/380 |

FOREIGN PATENT DOCUMENTS

| | | |
|---|---|---|
| A-2-236629 | 9/1990 | Japan . |
| A-2-297288 | 12/1990 | Japan . |
| A-4-268849 | 9/1992 | Japan . |
| A-5-63728 | 3/1993 | Japan . |

OTHER PUBLICATIONS

R. Braden, "Requirement for Internet Horts," Internet Engineering Task Force, RFC 1123, Oct. 1989 pp. 1–90.

*Primary Examiner*—Mehmet B. Geckil
*Attorney, Agent, or Firm*—Oliff & Berridge PLC

[57] ABSTRACT

When an information distribution section receives information sent from another information intervention apparatus, a distribution sensing section senses it and records a distribution history in a distribution history holding section. Each information intervention apparatus transmits distribution histories to a tracing center via a history sending section. In the tracing center, a distribution history collection section collects the distribution histories transmitted from the information intervention apparatuses, and stores those into a distribution history holding section. A tracing analysis section 23 analyzes an information distribution route etc. based on the distribution histories stored in the distribution history holding section 22. An analysis result display section 24 displays an analysis result.

8 Claims, 35 Drawing Sheets

| TARGET INFORMATION IDENTIFIER (12 BYTES) | SOURCE APPARATUS IDENTIFIER (8 BYTES) | RECEPTION TIME (7 BYTES) |
|---|---|---|
| 679840-176 | 898345 | 1995031012090441 |
| 800287-16 | 800287 | 1995031322233489 |
| 028765-1657 | 898345 | 1995031417455534 |
| ... | ... | ... |

FIG. 9

| COLLECTION SOURCE APPARATUS IDENTIFIER (8 BYTES) | TARGET INFORMATION IDENTIFIER (12 BYTES) | DISTRIBUTION SOURCE APPARATUS IDENTIFIER (8 BYTES) | RECEPTION TIME (7 BYTES) |
|---|---|---|---|
| 679840 | - | - | - |
| 800287 | 679840-176 | 679840 | 1995031417455534 |
| 028765 | 679840-176 | 679840 | 1995031012090441 |
| 380987 | 679840-176 | 028765 | 1995031322233489 |

FIG. 10 (A)

APP.: NULL
A
APP.: RECEIVED X
B   FROM A AT T3
APP.: RECEIVED X
C   FROM A AT T1
APP.: RECEIVED X
D   FROM C AT T2

↑ CONVERSION OF HISTORY DATA

FIG. 10 (B)

INF. X: A → C (T1)
        C → D (T2)
        A → B (T3)

FIG. 12

INF. X:  A → C (T1)
         C → D (T2)
         A → B (T3)

| TARGET INFORMATION IDENTIFIER (12 BYTES) | SOURCE APPARATUS IDENTIFIER (8 BYTES) | DISTRIBUTION APPARATUS IDENTIFIER (8 BYTES) | RECEPTION TIME (7 BYTES) |
|---|---|---|---|
| 679840-176 | 679840 | 028765 | 1995031012090441 |
| 679840-176 | 028765 | 3809987 | 1995031322233489 |
| 679840-176 | 679840 | 8002287 | 1995031417455534 |

FIG. 16

| HISTORY TYPE (1 BIT) | TARGET INFORMATION IDENTIFIER (12 BYTES) | SOURCE APPARATUS IDENTIFIER (8 BYTES) | ORIGINAL INFORMATION IDENTIFIER (12 BYTES) | RECEPTION TIME (7 BYTES) |
|---|---|---|---|---|
| 0 | 679840-176 | 898345 | - | 19950310120090441 |
| 1 | 761576-12 | - | 679840-176 | 19950311110504902 |
| 0 | 800287-16 | 800287 | - | 19950313222233489 |
| 1 | 761576-13 | - | - | 19950311110504902 |
| 0 | 028765-1657 | 898345 | - | 19950314174555534 |
| ... | ... | ... | ... | ... |

```
APP.:   CREATED X AT T0
A

APP.:   RECEIVED X FROM A AT T3
B       RECEIVED Z FROM C AT T7

APP.:   RECEIVED X FROM A AT T1
C       CREATED Y FROM X AT T4
        CREATED Z FROM Y AT T6

APP.:   RECEIVED X FROM C AT T2
D       RECEIVED Y FROM C AT T5
```

CONVERSION OF HISTORY DATA →

```
CREATION: X (A, T0)
          X → Y (C, T4)
          Y → Z (C, T6)
```

```
INF. X    : A → C (T1)
            C → D (T2)
            A → B (T3)
```

```
INF. Y    : C → D (T5)
```

```
INF. Z    : C → B (T7)
```

TRACING RESULT (DISTRIBUTION)    COMPLETED

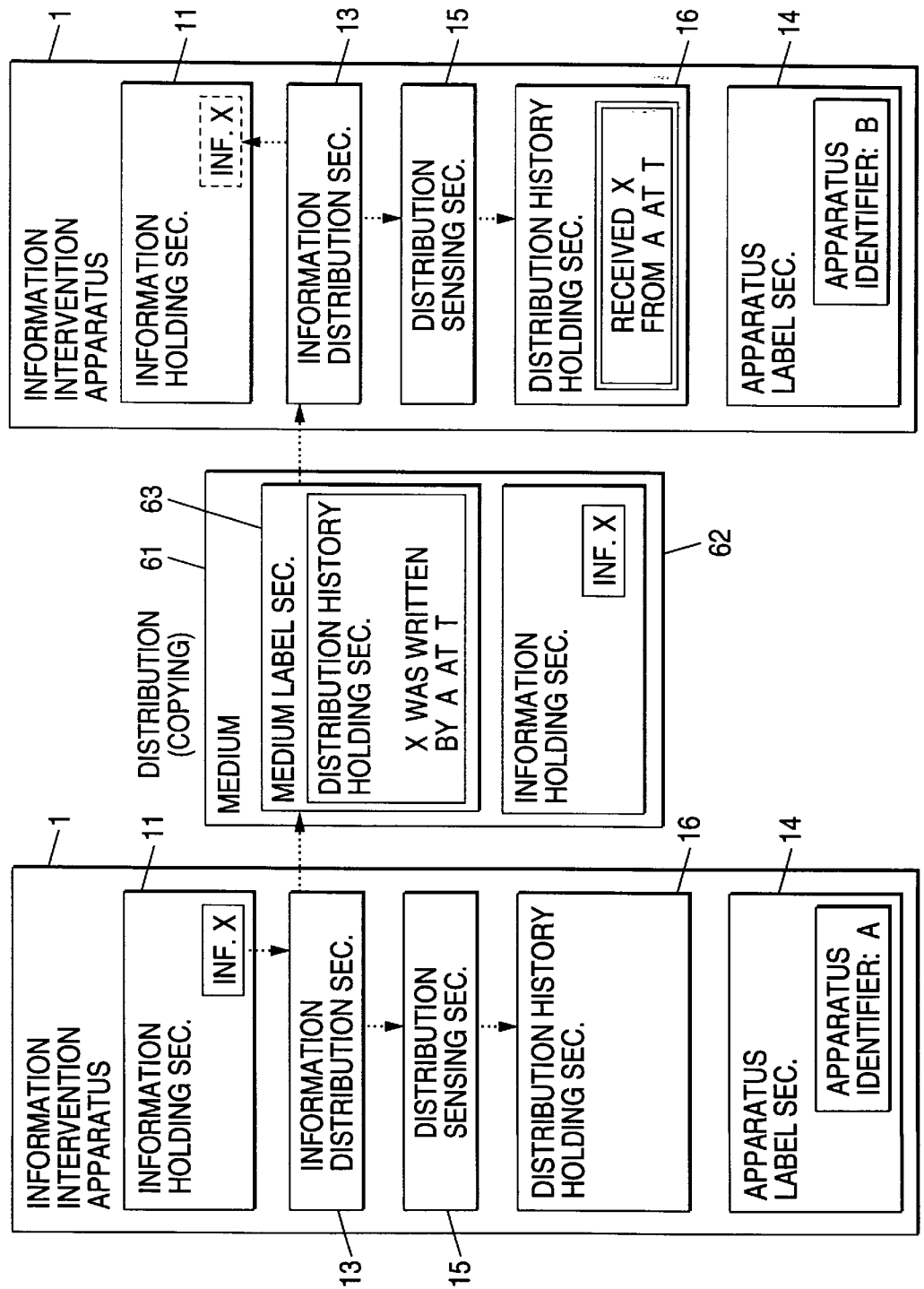

FIG. 35

| TARGET INFORMATION IDENTIFIER (12 BYTES) | SOURCE USER IDENTIFIER (8 BYTES) | DISTRIBUTION USER IDENTIFIER (8 BYTES) | RECEPTION TIME (7 BYTES) |
|---|---|---|---|
| 679840-176 | 19311 | 23076 | 1995031012090441 |
| 800287-16 | 15533 | 20673 | 1995031322233489 |
| 028765-1657 | 19311 | 20673 | 1995031417455534 |
| ... | ... | ... | ... |

FIG. 37A (APPARATUS A:) U2 RECEIVED X FROM U1 AT T3
U1 RECEIVED X FROM U3 AT T4
(APPARATUS B:) U3 RECEIVED X FROM U1 AT T1
U4 RECEIVED X FROM U3 AT T2

FIG. 37B

| TARGET INFORMATION IDENTIFIER (12 BYTES) | SOURCE USER IDENTIFIER (8 BYTES) | DESTINATION USER IDENTIFIER (8 BYTES) | RECEPTION TIME (7 BYTES) |
|---|---|---|---|
| 679840-176 | 19311 | 20987 | 19950314174 55534 |
| 98762-101 | 87298 | 19311 | 19950315100 50726 |
| 679840-176 | 19311 | 87298 | 19950310120 90441 |
| 679840-176 | 87298 | 20876 | 19950313222 33489 |

FIG. 38A

U3 RECEIVED X FROM U1 AT T1
U4 RECEIVED X FROM U3 AT T2
U2 RECEIVED X FROM U1 AT T3

FIG. 38B

| TARGET INFORMATION IDENTIFIER (12 BYTES) | SOURCE USER IDENTIFIER (8 BYTES) | DESTINATION USER IDENTIFIER (8 BYTES) | RECEPTION TIME (7 BYTES) |
|---|---|---|---|
| 679840-176 | 19311 | 87298 | 19950310120 90441 |
| 679840-176 | 87298 | 20876 | 19950313222 33489 |
| 679840-176 | 19311 | 20987 | 19950314174 55534 |

FIG. 42

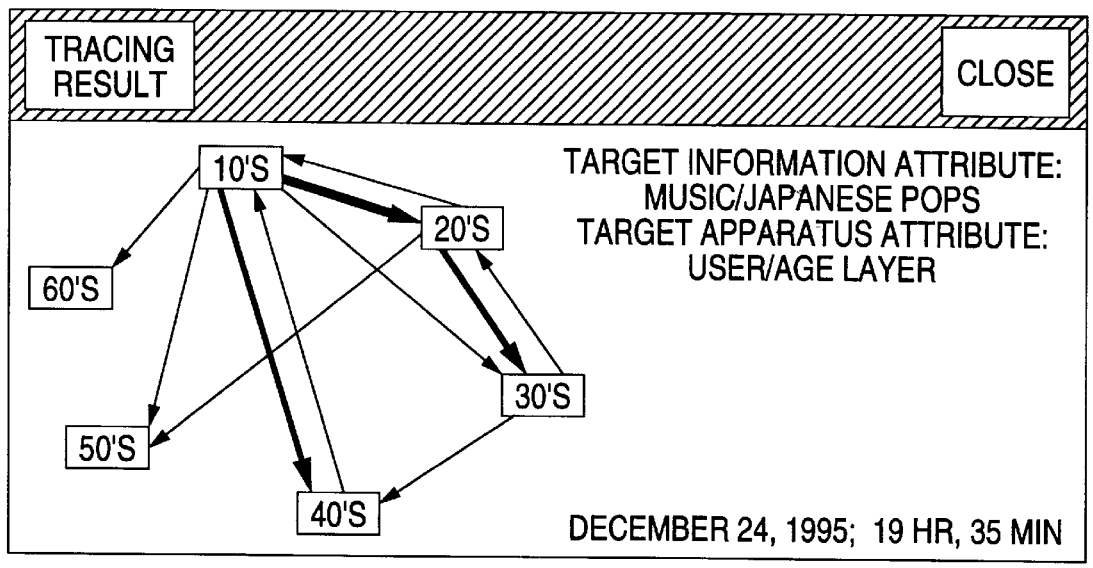

FIG. 43

| INFORMATION IDENTIFIER | INFORMATION ATTRIBUTES | | | ... |
| --- | --- | --- | --- | --- |
| | MAJOR CLASSIFICATION | MIDDLE CLASSIFICATION | MINOR CLASSIFICATION | |
| 10986-2067 | MUSIC | JAPAN | POPS | |
| 850198-231 | PROGRAM | WORD-PROCESSOR | - | |
| 9830-0987 | PROGRAM | GAME | RPG | |
| 8098-093 | DOCUMENT | COMUNICATION DOCUMENT | - | |
| ... | | | | |

FIG. 44

| APPARATUS IDENTIFIER | APPARATUS ATTRIBUTES | | | | | ... |
| --- | --- | --- | --- | --- | --- | --- |
| | USER | | | | MODEL NAME | |
| | NAME | AGE | JOB TYPE | GENDER | | |
| 898345 | TARO FUJI | 33 | ENGINEER | MALE | AB-5130C | |
| 800287 | HANAKO FUJI | 24 | OFFICE WORKER | FEMALE | DE-5090F | |
| 850198 | ... | | | | | |
| ... | | | | | | |

| SOURCE APPARATUS ATTRIBUTE VALUE | DESTINATION APPARATUS ATTRIBUTE VALUE | COUNT |
|---|---|---|
| 10'S | 10'S | 872998712 |
| 10'S | 20'S | 1097097 |
| 20'S | 10'S | 1982 |
| 10'S | 30'S | 50198 |
| ... | ... | ... |

INFORMATION TRACING SYSTEM AND INFORMATION TRACING METHOD

BACKGROUND OF THE INVENTION

1. Field of the Invention

This invention relates to an information processing method and an information processing system capable of tracing an information distribution route etc.

2. Description of the Related Art

We are about to open an age of digitalizing all information and distributing it through networks with the recent digital information technology development, information highway initiative, etc. Distribution of various pieces of information such as images, moving pictures, voice, and programs as well as text information has already begun through network media such as Internet and personal computer communication. Although information originators or issuers and receivers are distinguished clearly from each other with information media like conventional broadcasting, if such an age comes, all users will be both information originators (issuers) and receivers. Therefore, anybody can readily distribute various pieces of information in various forms. Digitalized information, which has a feature of easy copying, is distributed via a number of persons; it is distributed among the users who copy and redistribute the information, and the information distribution range and speed will be increased in an accelerated manner.

Under such circumstances, a situation in which once information is left from a person, how it is passed to and used by what person is unknown occurs. Each person may want to know whether or not once distributed information has been passed to his or her intended person, what point the information has been distributed to on the distribution route, what route the information has been distributed through, etc. Further, recently, programs into which computer viruses are mixed, information containing a violation of privacy, and the like have often been distributed illegally without recognition. When such illegal information is distributed, a demand for specifying the originator or issuer and the distribution route of the information also occurs. However, in the prior art, such demands cannot be fully solved, that is, only part thereof are solved.

For example, in an electronic mail communication network described in Japanese Unexamined Patent Publication No. Hei. 4-268849, in transfer of electronic mail, the transmitter prepares transmission and reception logs together with information to be sent to the receiver and transfers both as a unit to the receiver. At the node receiving the electronic mail, information concerning the originator name and passed-through node added to the received electronic mail can be compared with information concerning the network configuration held in the node to see if the electronic mail originator name is false.

However, in the electronic mail communication network, the passed-through node route when information is transmitted from one user A to another B is only recorded and when the information is further transmitted from user B to user C, user A information is not left. Thus, the function cannot be used for tracing across the users. Since the electronic mail communication network depends on a specific feature of electronic mail, for example, if information is simply copied from a storage of one person to a storage of another person, the route of distribution (in this case, copy) of the information is not recorded and the distribution route of the information cannot be known later. Further, for example, when the transmitter wants to know what point his or her transmitted information reaches at present, he or she cannot trace it.

In an office information processing system described in Japanese Unexamined Patent Publication No. Hei. 5-63728, control information indicating what processing can be performed after reception is added to electronic mail and history information on operation performed on received mail is stored. By referencing the history information, the transmitter can know whether or not transmitted electronic mail has been processed, for example. However, in the system, what route the information has been distributed through cannot be known although the originator of received electronic mail can be known. Like the above-mentioned electronic mail system, the office information processing system does not consider any distribution route other than the electronic mail system. Thus, in the office information processing system, the distribution route of received information cannot be known.

Further, in an electronic document preparation/approval system with an electronic certification function described in Japanese Patent Unexamined Publication No. Hei. 2-297288, certification data created by a certification process at approval is registered in a certification logging file, thereby enabling a document approval state to be traced. Since the electronic document preparation/approval system enables the approval requester to know the current approval state, even if a document is distributed to a person who does not perform an approval process, the fact cannot be known. As with the electronic mail communication network, if information not related to approval is simply copied from a storage of one person to a storage of another person, the route of distribution (in this case, copy) of the information is not recorded and the distribution route of the information cannot be known later.

As we have discussed, without using a special system such as the electronic mail or approval system, when various kinds of information are distributed by various methods through various persons, once distributed information cannot be traced to its distribution route and when illegal information is distributed, the originator (issuer) and distribution route of the information cannot be located either.

SUMMARY OF THE INVENTION

It is therefore an object of the invention to provide an information processing method and an information processing system for recording information on distribution when information is distributed, thereby enabling an information distribution route to be traced later.

According to the invention, there is provided an information tracing system comprising:

a plurality of distribution sensing means each for sensing information distribution from a first information processing apparatus as an information distribution source to a second information processing apparatus as an information distribution destination;

a plurality of distribution history storing means each for storing a history relating to the information distribution sensed by an associated one of the plurality of distribution sensing means;

a plurality of transmitting means each for transmitting the history stored in an associated one of the plurality of distribution history storing means;

a single receiving means for receiving the histories transmitted from the transmitting means; and analyzing means for analyzing a distribution route based on the histories received by the receiving means.

In the above configuration, the distribution sensing means may sense the information distribution by sensing sending of information when it is sent from the first information processing apparatus.

The distribution sensing means may sense the information distribution by sensing reception of information when it is received by the second information processing apparatus.

The distribution sensing means may sense the information distribution by sensing sending of information when it is sent from the first information processing apparatus, and by sensing reception of the information when it is received by the second information processing apparatus.

The information tracing system may further comprise:

editing means for editing information;

edit sensing means for sensing an edit performed by the editing means; and edit history storing means for storing a history relating to the edit sensed by the edit sensing means, and may be so constructed that the transmitting means transmits the history stored in the distribution history storing means and the history stored in the edit history storing means, and that the analyzing means analyzes the distribution route and an alteration of information based on the histories received by the receiving means.

The information tracing system may be so constructed that distributed information contains an information label therefor, and that the distribution history storing means stores the information label as part of the history relating to the information distribution.

The information tracing system may further comprise information label generating means for generating an information label based on distributed information, and may be so constructed that the distribution history storing means stores the information label generated by the information label generating means as the history relating to the information distribution.

The information tracing system may be so constructed that the distribution sensing means senses the information distribution when information stored on an information recording medium is distributed, and that the distribution history storing means stores, onto the information recording medium, the history relating to the information distribution and a medium label for the information recording medium together with the information.

The information tracing system may further comprise history requesting means for requesting the transmitting means to transmit histories of information, and may be so constructed that the transmitting means transmits the histories when so requested by the history requesting means.

The information tracing system may further comprise analysis requesting means for requesting the analyzing means to analyze the histories of information, and may be so constructed that the analyzing means analyzes the histories of information when so requested by the analysis requesting means.

The information tracing system may further comprise analysis result displaying means for displaying an analysis result of the analyzing means so as to change a display form in accordance with an information type and an attribute of a distribution destination and a distribution source.

The information tracing system may further comprise:

use sensing means for sensing use of information; and use history storing means for storing a history of the use of information sensed by the use sensing means.

The information tracing system may further comprise:

use sensing means for sensing use of information; and use history storing means for storing a history of the use of information sensed by the use sensing means, and may be so constructed that the analysis result displaying means displays the analysis result so that it is correlated with the history of the use of information stored in the use history storing means.

According to another aspect of the invention, there is provided an information tracing method comprising the steps of:

sensing information distribution from a first information processing apparatus as an information distribution source to a second information processing apparatus as an information distribution destination;

storing histories relating to the sensed information distribution;

transmitting the stored histories;

receiving the transmitted histories; and analyzing a distribution route based on the received histories.

According to the invention described above, information distribution from a distribution source to a destination is sensed, a history related to the information distribution is stored, and a distribution route is analyzed based on the stored information, whereby the distribution route can be traced. The distribution route is a concept also containing the information transmission source, the transmission route, the distribution range, the distributed information amount, etc. As histories related to distribution, information containing the distribution source or destination identifier can be stored as in the invention.

When information is edited by the editing means, it is sensed by the edit sensing means and a history related to the edit is stored in the edit history storing means. When information distribution from a distribution source to a destination is sensed by the distribution sensing means, a history related to the distribution is stored in the distribution history storing means. The analyzing means analyzes the distribution route and information change based on the histories stored in the edit history storing means and the histories stored in the distribution history storing means, whereby the source information at the information preparation and the edit process during the distribution can also be known.

Information labels can be stored as histories related to distribution. The information labels are related to the information, whereby the histories related to distribution can be easily stored and analyzed and information can be easily referenced from the analyzed distribution route information. The information labels prepared by the information label generating means are stored in the distribution history storing means, whereby the need for managing the information labels in relation to the information is eliminated, facilitating information management.

Information distribution from a distribution source to a destination is sensed by the distribution sensing means and a history related to the information distribution is stored in the distribution history storing means. The transmitting means transmits the histories stored in the distribution history storing means. The transmitted histories are sent to an information processing system having the receiving means, for example. For example, the receiving means receives histories related to distribution of information transmitted from an external system such as an information processing system having the receiving means, and the analyzing means analyzes the distribution route based on the received histories. Further, the above means may be combined so that information distribution from a distribution source to a destination is sensed by the distribution sensing means, its history is stored in the distribution history storing means, and the histories stored therein are transmitted by the transmitting means. The receiving means receives the histories and the analyzing means analyzes the distribution route based on the received histories. Thus, the distribution history storing means for storing the histories related to information distribution and the analyzing means for analyzing the distribution route using the histories can be provided separately.

The distribution sensing means can be adapted to sense the information distribution when information is distributed from a distribution source. Alternatively, the distribution sensing means can be adapted to sense the information distribution when information is distributed to a distribution destination. As a further alternative, the distribution sensing means can be adapted to sense the information distribution when information is distributed from a distribution source and when information is distributed to a distribution destination.

The distribution sensing means can be adapted to sense the information distribution when information stored on an information recording medium is distributed, and the distribution history storing means can be adapted to store a history related to the distributed information on the information recording medium . Alternatively, the distribution history storing means can be adapted to store medium labels which are labels for media. As a result, the information processing system can also deal with the case where information is distributed with information recording media.

In the information processing system, the transmitting means can be adapted to transmit histories when receiving a request from the history requesting means.

The analyzing means can be adapted to make an analysis when receiving a request from the analysis requesting means.

Further, the analysis result displaying means for displaying the result of analysis executed by the analyzing means can be provided, and when displaying the analysis result, the analysis result displaying means can change the display form in response to information type, distribution destination and source attributes, etc. As a result, the correlation between the system attributes, such as user age, gender, and job type and the distributed information attributes, such as music genre, report type, and software type like word processors, and distribution routes can be examined.

Further, the use sensing means for sensing use of information and the use history storing means for storing a history of use of information sensed by the use sensing means can be provided; for example, a history related to use as to whether or not distributed information is actually used can be stored. The analysis result displaying means displays such use histories together with the analysis result for distribution analyzed by the analyzing means. As a result, the information distribution state as to how information is distributed for frequent use of the information, for example, can be examined from the viewpoints as to whether or not information is distributed and whether or not the distributed information is actually used.

BRIEF DESCRIPTION OF THE DRAWING

FIG. 9 is an illustration of an example of distribution histories collected by the tracing center and recorded in a distribution history holding section in the first embodiment of the information processing system of the invention;

FIG. 10 is an illustration of an example of the operation of a tracing analysis section in the first embodiment of the information processing system of the invention;

FIG. 12 is an illustration of an example of the analysis result of the tracing analysis section in the first embodiment of the information processing system of the invention;

FIG. 16 is an illustration of an example of distribution histories in the second embodiment of the information processing system of the invention;

FIG. 28 is an illustration of another example of recording histories in the information intervention apparatuses in the fourth embodiment of the information processing system of the invention;

FIG. 35 is an illustration of an example of distribution histories held in a distribution history holding section of the information intervention apparatus in the sixth embodiment of the information processing system of the invention;

FIGS. 37A and 37B are illustrations of examples of distribution histories collected by a tracing center and held in a distribution history holding section in the sixth embodiment of the information processing system of the invention;

FIGS. 38A and 38B are illustrations of examples of the analysis result of a tracing analysis section in the sixth embodiment of the information processing system of the invention;

FIG. 42 is an illustration of an example of distribution route display produced by an analysis result display section in the seventh embodiment of the information processing system of the invention;

FIG. 43 is an illustration of an example of an information attribute database in the seventh embodiment of the information processing system of the invention;

FIG. 44 is an illustration of an example of an apparatus attribute database in the seventh embodiment of the information processing system of the invention;

DESCRIPTION OF THE PREFERRED EMBODIMENTS

Referring now to the accompanying drawings, preferred embodiments of the invention will be described.

First embodiment

Figure 1:
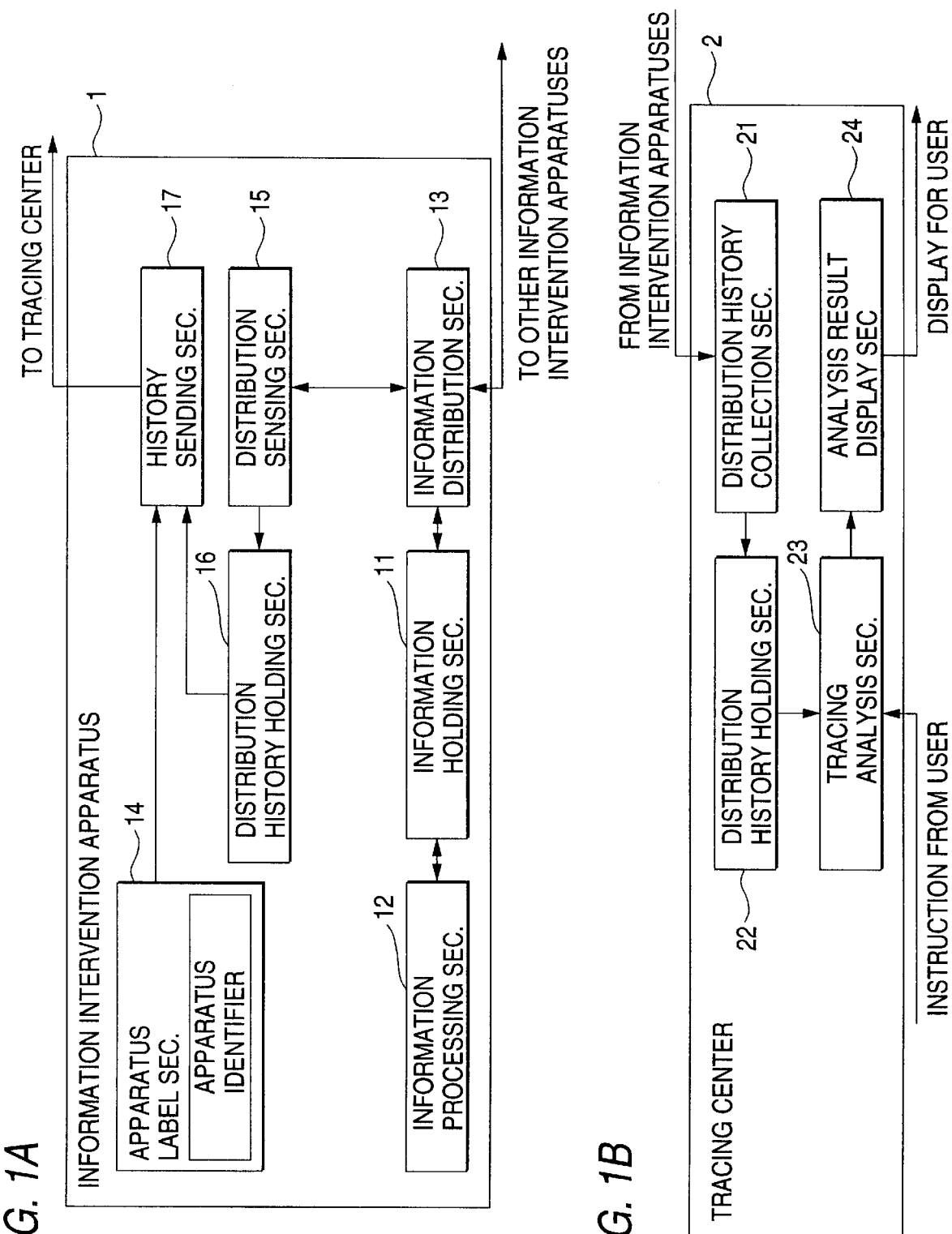
FIGS. 1A and 1B are block diagrams to show a first embodiment of an information processing system of the invention.

FIGS. 1A and 1B are block diagrams to show a first embodiment of an information processing system of the invention; FIG. 1A is a block diagram to show an information intervention apparatus in the first embodiment and FIG. 1B is a block diagram to show a tracing center in the first embodiment. In FIGS. 1A and 1B, numeral 1 is an information intervention apparatus, numeral 2 is a tracing center, numeral 11 is an information holding section, numeral 12 is an information processing section, numeral 13 is an information distribution section, numeral 14 is an apparatus label section, numeral 15 is a distribution sensing section, numeral 16 is a distribution history holding section, numeral 17 is a history sending section, numeral 21 is a distribution history collection section, numeral 22 is a distribution history holding section, numeral 23 is a tracing analysis section, and numeral 24 is an analysis result display section.

The information intervention apparatus 1 has the apparatus label section 14, the distribution sensing section 15, the distribution history holding section 16, and the history sending section 17 in addition to the information distribution section 13 for distributing information, the information processing section 12 for processing information, the information holding section 11 for holding information 11, etc., contained in a conventional information intervention apparatus. The information intervention apparatus 1 mentioned in the invention refers to an apparatus for intervening in transfer of information in a broad sense; specifically, it includes not only apparatuses dedicated to information transfer, such as a gateway in a network or an exchange in a telephone network, but also apparatuses resultantly distributing information, such as an information processing apparatus like a workstation or personal computer connected to a network. It also contains a mail server, etc., for distributing electronic mail on a network. Further, it contains an electronic information machine such as a disk drive for reading and writing information storage media such as hard disk or floppy disk; information copying, etc., between information storage media or within a single information storage medium corresponds to information distribution.

The information holding section 11 stores information processed by the information intervention apparatus 1. In fact, for example, it is made of a memory or a magnetic disk unit.

Figure 2:
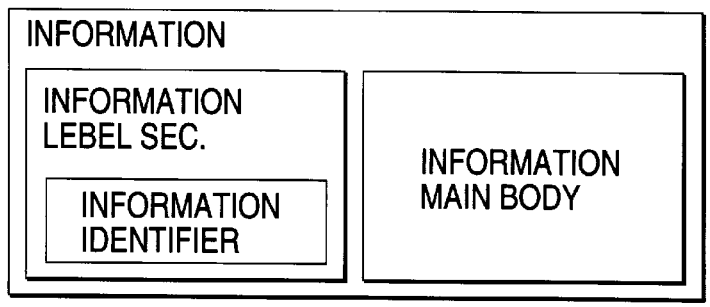
FIG. 2 is an illustration of an example of the format of information in the first embodiment of the information processing system of the invention.

FIG. 2 is an illustration of an example of the format of information in the first embodiment of the information processing system of the invention. The information consists of an information label section and an information main body. The information label section holds an information identifier to uniquely identify the information or a label according to which the information can be identified, such as a label represented by a machine name plus a file name, instead of the unique identifier. Generally, in addition to the information identifier, attributes concerning the information, such as the information creator and creation date, may be stored in the information label section. In a system in which a user is charged for a service in accordance with the amount of use of information, charge information is also stored in the information label section. If only the information identifier is stored in the information label section, it may be attached to the information main body without providing the information label section. In any way, the information identifier or such information stored in the information label section has no meaning if it is separated from the information main body. Thus, generally it is encrypted so as not to be separated at the distribution time. The information main body is information having essential meanings and contains various kinds of information such as images, programs, texts, and moving pictures.

Referring again to FIG. 1, the information processing section 12 processes the information stored in the information holding section 11. For example, if the information intervention apparatus 1 is a workstation or a personal computer, it performs various types of processing such as document preparation for the user to prepare a document in an interactive mode. The information distribution section 13 exchanges information with other information intervention apparatuses. In fact, for example, it is made up of a network interface, a modem, etc., for transmitting and receiving information to and from other information intervention apparatuses via a network.

The apparatus label section 14 holds an apparatus identifier for uniquely identifying the information intervention apparatus 1. For example, the apparatus identifier is given when the information intervention apparatus is manufactured. Alternatively, when the apparatus is configured, a unique apparatus identifier may be given. The apparatus identifier need not be seen directly from the information intervention apparatus user; when the tracing center described later collects a distribution history, the apparatus identifier is used to identify the apparatus corresponding to the distribution history.

The distribution sensing section 15 always senses whether or not the information distribution section 13 exchanges information with another information intervention apparatus. When information is exchanged, it senses information on the exchange and records it in the distribution history holding section 16. For example, if the information distribution section 13 is made of a network interface, this network interface may be monitored to sense the information exchange. The identifier of transferred information, the associated transfer apparatus identifier, the distribution time of day, and the like are to be sensed. The distribution time of day may be specified with a timer or clock contained in each apparatus.

The distribution history holding section 16 records the distribution information sensed by the distribution sensing section 15. In fact, for example, it is made of an external storage such as a magnetic disk unit or a memory.

The history sending section 17 sends the distribution history held in the distribution history holding section 16 to the tracing center 2 (described later). At this time, the apparatus identifier of the information intervention apparatus 1 is given to the distribution history to indicate the information intervention apparatus recording the history. The distribution history may be collected when the tracing center 2 issues a collection request or when the information intervention apparatus 1 sends the distribution history voluntarily. Specifically, the history sending section 17 can be made up of a network, a telephone line, a modem, etc., for example. However, it is not limited to them and any other means may be used if it can accomplish a similar purpose, needless to say.

As shown in FIG. 1B, the tracing center 2 has the distribution history collection section 21, the distribution history holding section 22, the tracing analysis section 23, etc. It can also be provided with the analysis result display section 24. For example, the tracing center 2 collects a distribution history from each information intervention apparatus 1 as required, for example, according to a user's request or every given time interval, and analyzes the history information, thereby deriving information concerning the distribution route such that one information was distributed via which information intervention apparatuses and information concerning distribution such that which apparatus has input/output how much information. For example, one information can be traced from the information concerning the distribution route and the tracing result is displayed in the form that can be understood by the person who requires the trace information, or is used to cause a computer to perform some automatic processing. In the invention, the essential roles of the tracing center 2 are up to analyzing the trace information, and the subsequent processing is not limited. A specific example of displaying the trace information in the format that can be understood by humans is used in the description that follows.

The distribution history collection section 21 has a function of collecting the distribution histories held in the information intervention apparatuses 1 through a network, a communication line, etc. Like the history sending section 17 in the information intervention apparatus 1, the distribution history collection section 21 can be made up of a network, a telephone line, a modem, etc., for example. However, it is not limited to them and any other means may be used if it can accomplish a similar purpose, needless to say.

The distribution history holding section 22 holds the collected distribution histories. In fact, for example, it is made of a memory or an external storage.

The tracing analysis section 23 analyzes the collected distribution histories about the item specified by an instruction of the user or the like. It analyzes various pieces of information on distribution such that information was distributed via which information intervention apparatuses for each information and that how much information is distributed between specific information intervention apparatuses.

The analysis result display section 24 displays the analysis result of the tracing analysis section 23 in the format that can be understood by the user, etc. In the embodiment, the analysis result display section 24 is used for visualizing the analysis result of the trace information in the format that can be understood by human beings, but the invention is not limited to it, as described above. If the analysis result is used by a computer, etc., for performing automatic processing, the analysis result display section 24 can be provided by another processing means.

Figure 3:
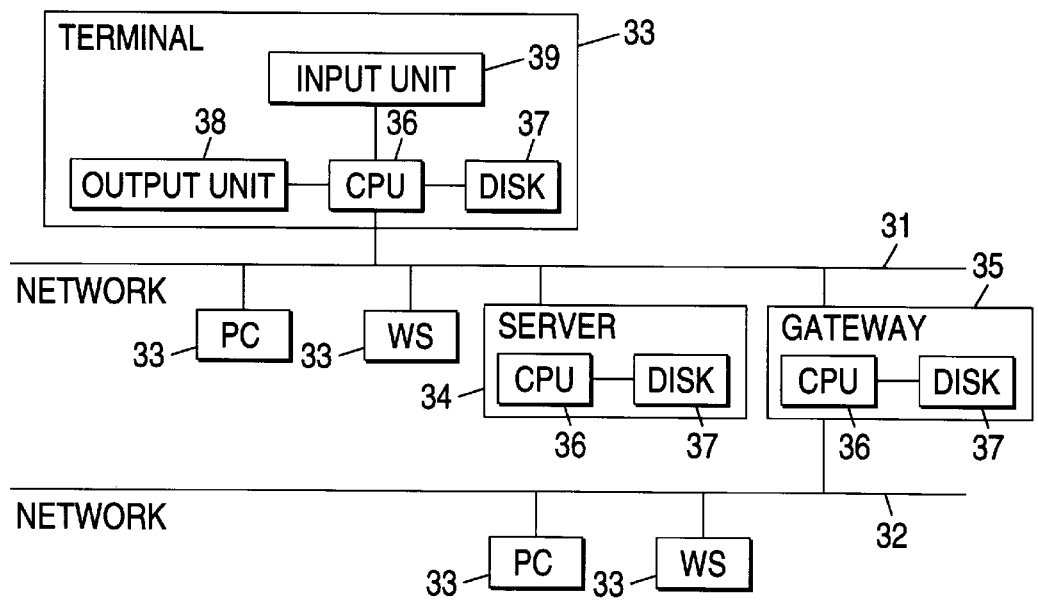
FIG. 3 is a hardware block diagram to show an example for providing the first embodiment of the information processing system of the invention.

FIG. 3 is a hardware block diagram to show an example for providing the first embodiment of the information processing system of the invention. In the figure, numerals 31 and 32 are networks, numeral 33 is a terminal, numeral 34 is a server, numeral 35 is a gateway, numeral 36 is a CPU, numeral 37 is a disk, numeral 38 is an output unit, and numeral 39 is an input unit. The example shown in FIG. 3 is made up of machines connected through some communication means, such as the terminals 33 of workstations, personal computers, etc., and the server 34 connected through communication means such as the networks 31 and 32 and the gateway 35 for connecting the networks. The terminals 33 are made of general workstations, personal computers, etc., each of which consists of a CPU 36, a disk 37, an output unit 38 such as a display, and an input unit such as a keyboard and a mouse. The server 34 and the gateway 35 are also general machines each consisting of a CPU 36, a disk 37, etc. The machines need not always be connected to the network and may be connected thereto only when necessary. For example, a portable personal computer or the like normally is used on a stand-alone basis and when necessary, is connected to the network by a telephone line, Ethernet, etc.

The information intervention apparatuses 1 can be related to all or some of the machines shown in FIG. 3. The tracing center 2 may be configured so as to serve the function by a specific apparatus such as the server 34.

Next, the operation in the first embodiment of the information processing system of the invention will be outlined. In the invention, distribution of information in which an information intervention apparatus intervenes is sensed, and a history concerning the sensed information distribution is recorded in the information intervention apparatus. After the information is distributed, the tracing center collects the distribution history information from the information intervention apparatuses involved and analyzes the distribution route and range of the information.

Figure 4:
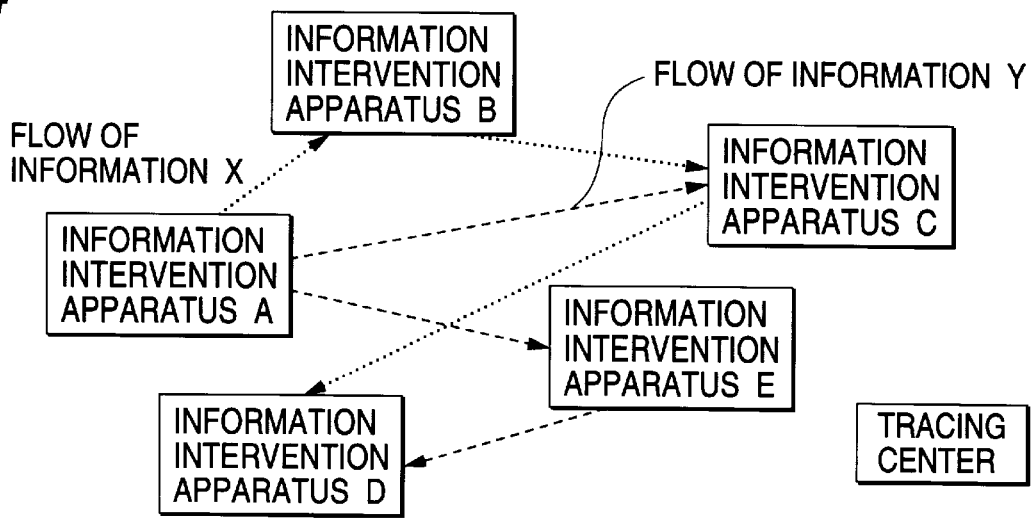
FIG. 4 is an illustration of an example of information flows in the first embodiment of the information processing system of the invention.
Figure 5:
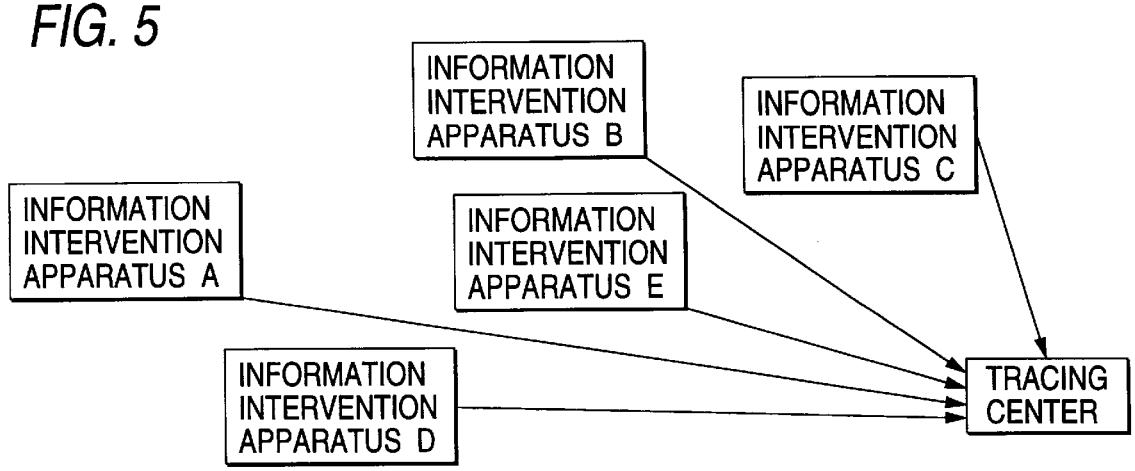
FIG. 5 is an illustration of an example of distribution history collection flows in the first embodiment of the information processing system of the invention.

FIG. 4 is an illustration of an example of information flows in the first embodiment of the information processing system of the invention. FIG. 5 is an illustration of an example of distribution history collection flows in the first embodiment of the information processing system of the invention. FIGS. 4 and 5 show five information intervention apparatuses A-E and a tracing center 2 and indicate how information X with identifier X and information Y with identifier Y are distributed. How information X is distributed is indicated by dotted lines; it is distributed from information intervention apparatus A to information intervention apparatus B to information intervention apparatus C to information intervention apparatus D. How information Y is distributed is indicated by broken lines; it is distributed from information intervention apparatus A to information intervention apparatus C on one path and to information intervention apparatus E to information intervention apparatus D on another path.

When information is thus distributed from one information intervention apparatus to another, a history concerning distribution of the information, namely, a distribution history is stored. FIG. 5 shows how information distribution histories stored in the information intervention apparatuses A–E are collected by the tracing center. The information distribution histories thus collected are analyzed on various distribution items such as the information distribution routes and range and the distributed information amount, whereby one information can also be traced, for example.

Figure 6:
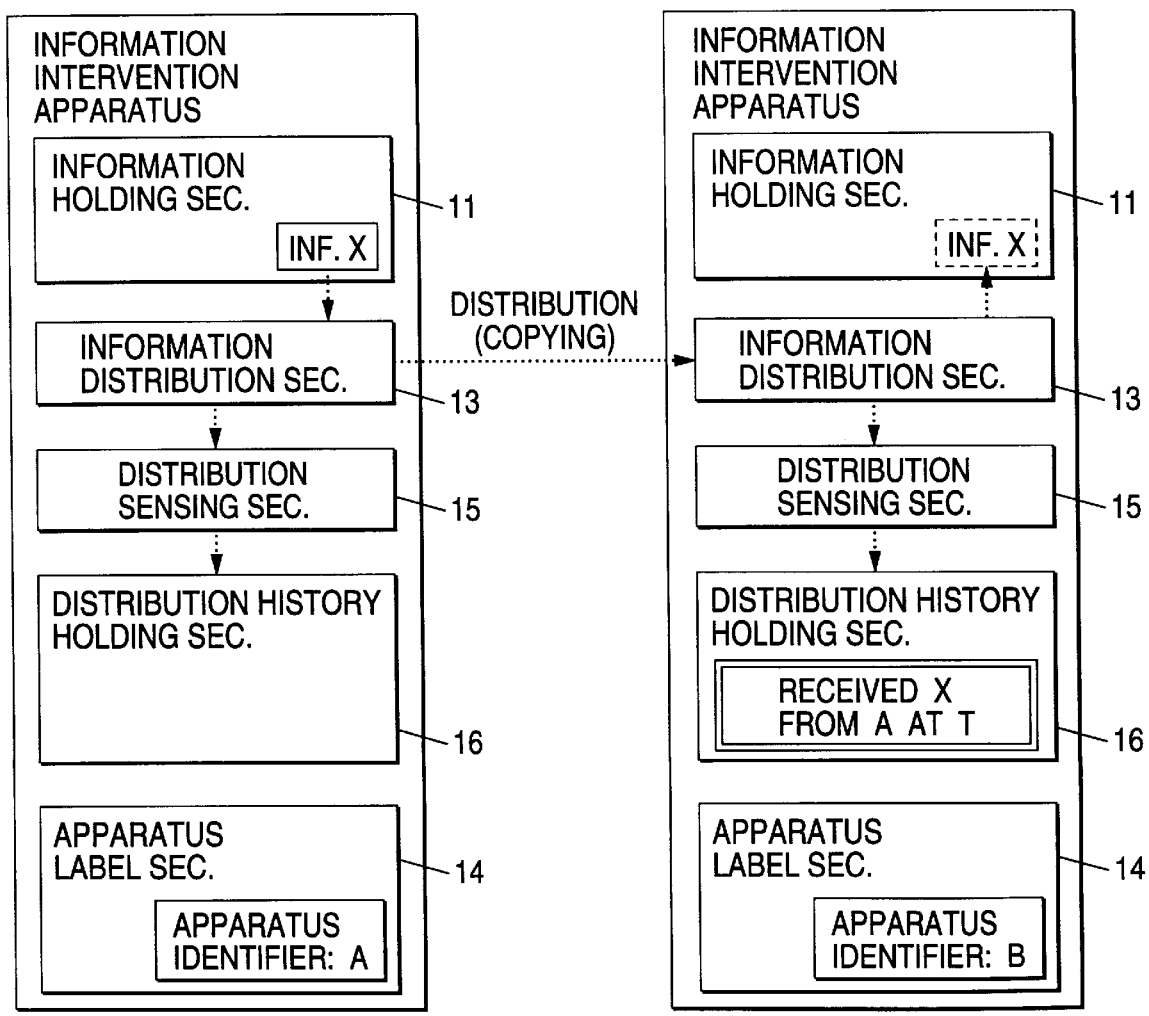
FIG. 6 is an illustration for recording histories in the information intervention apparatuses in the first embodiment of the information processing system of the invention.

Next, the example of the operation in the first embodiment of the information processing system of the invention will be discussed in more detail. FIG. 6 is an illustration for recording histories in the information intervention apparatuses in the first embodiment of the information processing system of the invention. In the figure, 'A' is stored in the apparatus label section 14 of the left information intervention apparatus as its apparatus identifier. Assume that the information intervention apparatus having the apparatus identifier A is information intervention apparatus A. 'B' is stored in the apparatus label section 14 of the right information intervention apparatus as its apparatus identifier. Assume that the information intervention apparatus having the apparatus identifier B is information intervention apparatus B. Now, assuming that information with information identifier X (simply, information X) is distributed from information intervention apparatus A to information intervention apparatus B, the operation will be described.

The information holding section 11 of the information intervention apparatus A holds the information X. When it becomes necessary to send the information X to the information intervention apparatus B in response to a user's instruction, etc., the information X is passed to the information distribution section 13 of the information intervention apparatus A. The information distribution section 13 passes it to the information distribution section 13 of the information intervention apparatus B, for example, sends a copy of the information X thereto. The information distribution section 13 of the information intervention apparatus B stores the copy of the information X received from the information intervention apparatus A in the information holding section 11 of the information intervention apparatus B.

In the embodiment, the distribution sensing section 15 always monitors the information distribution section 13. It checks whether or not the information distribution section 13 receives information from an external apparatus. If the information distribution section 13 receives information, the distribution sensing section 15 records the information identifier of the received information, the apparatus identifier of the source information intervention apparatus, and the reception time of day in the distribution history holding section 16. In the example shown in FIG. 6, the distribution sensing section 15 of the information intervention apparatus B as the information receiving party senses that the information distribution section 13 has received the information from the information intervention apparatus A, and records a distribution history in the distribution history holding section 16 of the information intervention apparatus B. For example, the history "received X from A at T" is recorded, which means that information X was received from information intervention apparatus A at time T."

Figures 7, 8:
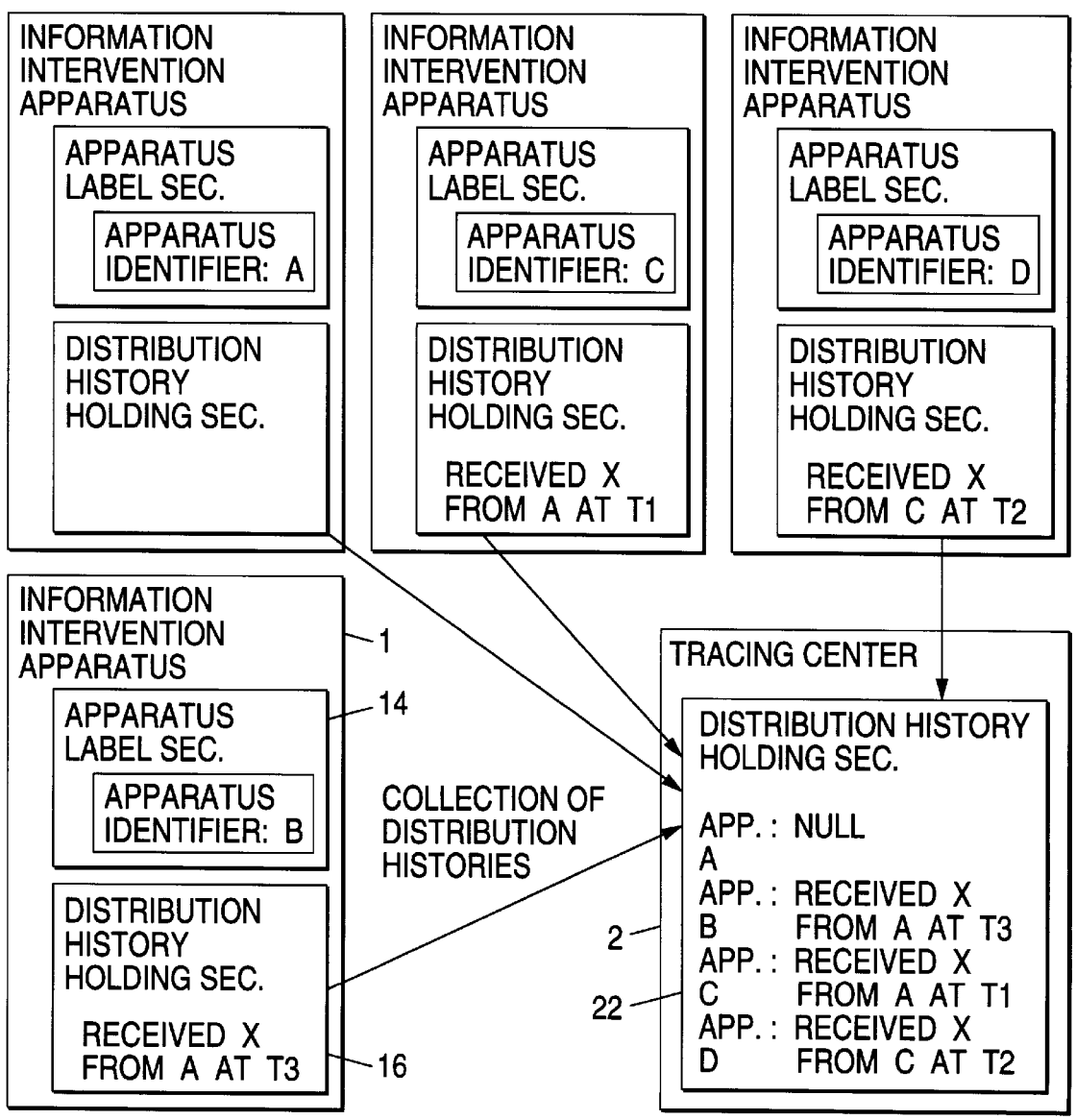
FIG. 7 is an illustration of an example of distribution histories in the first embodiment of the information processing system of the invention.
FIG. 8 is an illustration of collection of distribution histories by a tracing center in the first embodiment of the information processing system of the invention.

FIG. 7 is an illustration of an example of distribution histories in the first embodiment of the information processing system of the invention. The actual contents recorded in the distribution history holding section 16 may be recorded as a character string as described above, but can also be recorded as binary data as shown in FIG. 7. In the figure, the target information identifier corresponds to "X," the source apparatus identifier to "A," and the reception time to "T."

One row in the table shown in FIG. 7 represents one distribution history. For example, the information on the top row in the table means that information having identifier "679840-176" was received from information intervention apparatus having identifier "898345" at 12 hours 9 minutes 4 seconds 41 on Mar. 10, 1995. Therefore, each time one information is distributed, its distribution history will be added to the distribution history holding section 16. In the description to follow, basically the representation "received X from A at T" is used for the history contents for simplicity. However, binary representation as shown in FIG. 7 or the like can also be used.

FIG. 8 is an illustration of collection of distribution histories by the tracing center in the first embodiment of the information processing system of the invention. The distribution histories recorded for each information intervention apparatus as shown in FIG. 6 are collected by the tracing center. The distribution history collection section 21 in the tracing center collects the distribution histories recorded in the distribution history holding sections 16 from the information intervention apparatuses, sorts out the collected distribution histories for each information intervention apparatus, and records them in the distribution history holding section 22 in the tracing center.

In FIG. 8, no distribution history is recorded in the distribution history holding section 16 of the information intervention apparatus A. Distribution history "received X from A at T3" is recorded in the distribution history holding section 16 of the information intervention apparatus B, "received X from A at T1" is recorded in the distribution history holding section 16 of the information intervention apparatus C, and "received X from C at T2" is recorded in the distribution history holding section 16 of the information intervention apparatus D. The tracing center collects the distribution histories, sorts out them for each information intervention apparatus, and records them in the distribution information holding section 22, whereby the distribution histories are recorded in the distribution information holding section 22 as shown in FIG. 8.

FIG. 9 is an illustration of an example of distribution histories collected by the tracing center and recorded in the distribution history holding section in the first embodiment of the information processing system of the invention. It shows the distribution histories as binary data like those shown in FIG. 7. The data structure of each distribution history recorded in the distribution history holding section 22 in the tracing center has a field in which the apparatus identifier of each information intervention apparatus from which the distribution history is collected is stored in addition to the data structure of each distribution history recorded in the distribution history holding section 16 of each information intervention apparatus shown in FIG. 7.

The distribution histories shown in FIG. 9 mean the same contents as those collected by the tracing center and stored in the distribution history holding section 22 in FIG. 8. For example, the collection source apparatus identifier "679840" means the information intervention apparatus A. Since no histories were collected from the information intervention apparatus A, no values are stored in the subsequent fields. The collection source apparatus identifier on the next row "800287" means the information intervention apparatus B; the history on the row means that information "679840-176", which corresponds to information X, was received from apparatus "679840," namely, the information intervention apparatus A at time "1995031417455534." Likewise, the collection source apparatus identifier "028765" means the information intervention apparatus C and the collection source apparatus identifier "380987" means the information intervention apparatus D; information of the distribution histories collected from the information intervention apparatuses is stored.

The following parameters are available for determining a distribution history collection method and a specific collection method is determined by a combination of the parameters.

1) Collection direction:
   a) A collection instruction is issued from the tracing center to each information intervention apparatus; or
   b) each information intervention apparatus voluntarily sends distribution histories to the tracing center.
2) Collection timing:
   a) At given time intervals (for example, every other month) or when one condition (when the distribution history holding section of each information intervention apparatus becomes full of distribution histories) is satisfied; or
   b) when a distribution history analysis becomes necessary.

Of these parameter combinations, the combination of 1-b and 2-b does not become true, because only the tracing center can decide that a trace analysis is necessary and each information intervention apparatus cannot detect necessity for a trace analysis for voluntarily sending distribution histories. For the combination of 1-a and 2-b, a choice is made between the following two alternatives.

3) Collection contents:
   a) Collection of all histories; or
   b) collection of only necessary histories.

The following four distribution history collection methods can be used according to the parameter combinations of 1-a and 2-a; 1-a, 2-b, and 3-a; 1-a, 2-b, and 3-b; and 1-b and 2-a.

(1) A collection instruction is issued from the tracing center at given time intervals or for each condition (combination of 1-a and 2-a).

A collection instruction is issued from the tracing center to each information intervention apparatus at given time intervals, for example, once a month or a week, and the information intervention apparatuses send all distribution histories held at the point in time to the tracing center. In this method, the tracing center needs to keep track of all information intervention apparatuses and hold the history information in the distribution history holding section in the tracing center.

(2) A collection instruction is issued from the tracing center whenever necessary and all distribution histories are collected (combination of 1-a, 2-b, and 3-a).

A distribution history collection instruction is issued from the tracing center to each information intervention apparatus when a trace becomes necessary, and the information intervention apparatuses send all distribution histories held at the point in time to the tracing center. As with (1), the tracing center needs to keep track of all information intervention apparatuses.

(3) A collection instruction is issued from the tracing center whenever necessary and only necessary distribution histories are collected (combination of 1-a, 2-b, and 3-b).

A collection instruction of only distribution histories required for tracing is issued from the tracing center to each information intervention apparatus when a trace becomes necessary, and the information intervention apparatuses send only distribution histories matching the contents specified in the instruction. The distribution history collection instruction is, for example, to instruct that "only distribution histories related to information identifier X to be sent." If the distribution histories matching the instruction contents do not exist in the information intervention apparatuses, no response is made or NULL is sent. As with (1), the tracing center needs to keep track of all information intervention apparatuses.

(4) Each information intervention apparatus voluntarily sends histories at given time intervals or depending on the condition (combination of 1-b and 2-a).

Each information intervention apparatus voluntarily sends all histories to the tracing center for each given condition. The given condition is, for example, once a month or a week, when the distribution history holding section of each information intervention apparatus becomes full of distribution histories, or the like. For this method, such a processing section for determining whether or not a given condition is satisfied and automatically transmitting histories when the condition is satisfied may be added to the history sending section 17 of each information intervention apparatus.

FIG. 10 is an illustration of an example of the operation of the tracing analysis section in the first embodiment of the information processing system of the invention. The tracing analysis section 23 in the tracing center analyzes collected distribution histories. Here, assume that it outputs the trace information of one information as the analysis result.

Since collected distribution histories are information for each information intervention apparatus, a distribution route centering on information is not found without any processing. Then, the tracing analysis section 23 converts the collected distribution histories into route information for each information. For example, assume that distribution histories as shown in FIG. 10(A) are collected. In this example, only distribution histories related to information X are shown. In fact, distribution histories related to different information items are mixed, thus the distribution histories related to the information X are extracted from among them. The extracted distribution histories are converted into distribution information for each information as shown in FIG. 10(B).

Figure 11:
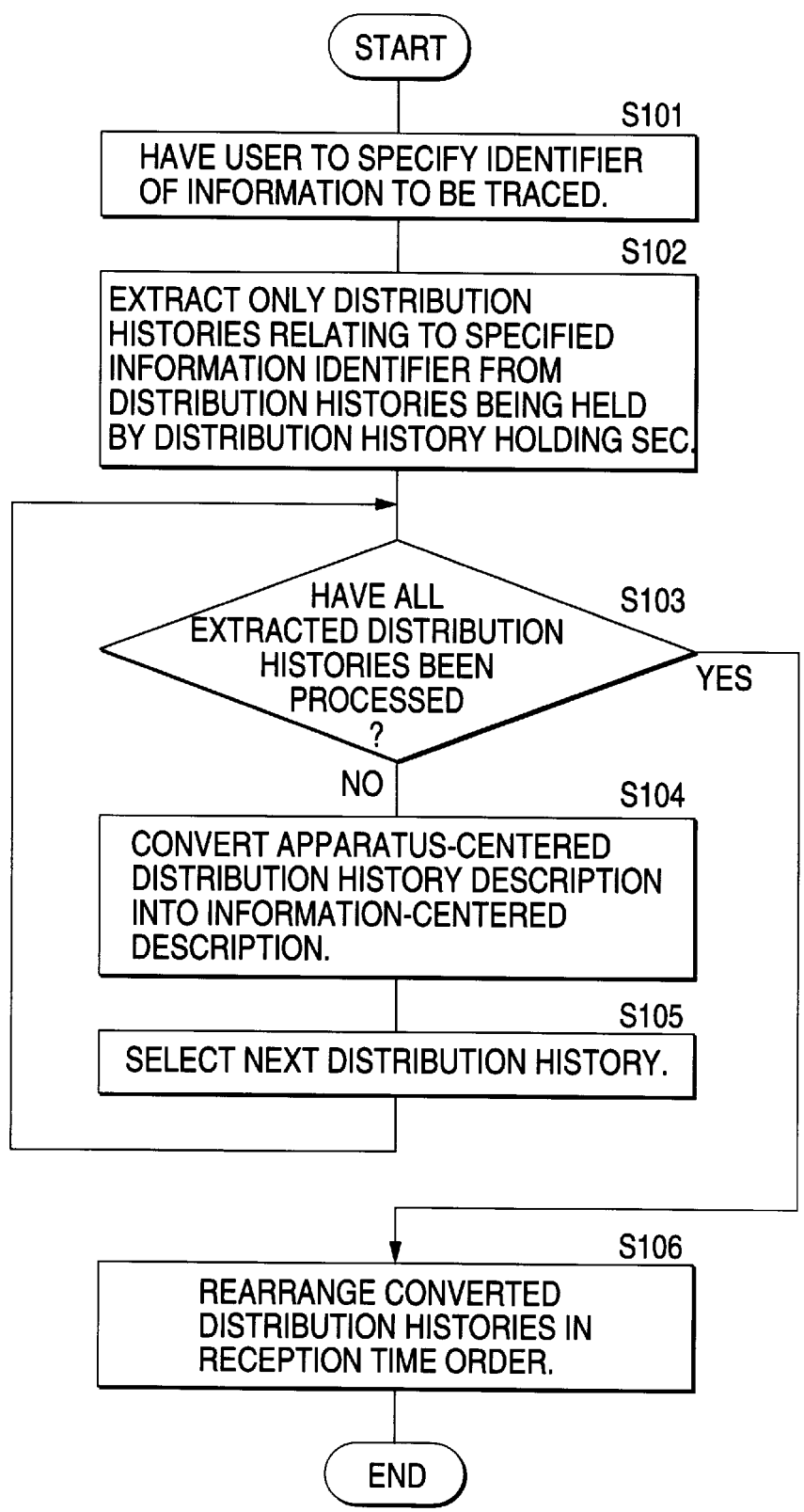
FIG. 11 is a flowchart to show an example of the operation of the tracing analysis section in the first embodiment of the information processing system of the invention.

FIG. 11 is a flowchart to show an example of the operation of the tracing analysis section 23 in the first embodiment of the information processing system of the invention. Conversion of the distribution histories to the distribution information is executed, for example, as follows: First, at step S101, the user, etc., is prompted to specify the identifier of the information to be traced. At step S102, only distribution histories related to the information to be traced, specified at step S101 are extracted from the distribution histories held in the distribution history holding section 22. At steps S103–S105, the distribution history description form is converted into a description centering on information as to when the information was distributed from which information intervention apparatus to which information intervention apparatus, for example. That is, at step S103, whether the conversion process for all the distribution histories extracted at step S102 is complete is determined. If an unprocessed distribution history remains, the distribution history description is converted from the description for each information intervention apparatus into description for each information at step S104. Another distribution history is selected at step S105 and control returns to step S103. Upon completion of the conversion process for all the distribution histories extracted at step S102, the distribution histories subjected to the conversion process are again sorted in the reception time order at step S106.

Processing for the information X will be discussed according to FIG. 10. First, information identifier X is specified at step S101. Only histories related to information X are selected at step S102. In other words, only the distribution histories beginning with "received X" are extracted, whereby three lower rows in FIG. 10(A) are extracted. The extracted distribution histories are description for each information intervention apparatus.

Next, at steps S103–S105, the description is converted. After a check is made to ensure that an unprocessed distribution history exists, for example, the following distribution history "Apparatus B: received X from A at T3" is selected. This distribution history is converted into "Information X: A→B (T3)"

at step S104. This means that information X was distributed from information intervention apparatus A to information intervention apparatus B at time T3. Information may be distributed to a number of users or information intervention apparatuses at the same time. In this case, for example, the destinations may be separated by a comma to the right of the arrow as "A→B, C, D (T3)." Alternatively, it may also be separated as "A→B (T3)," "A→C (T3)," "A→D (T3)." Another distribution history is selected at step S105 and control returns to step S103 at which the conversion process is repeated. Upon completion of the conversion process for the three distribution histories, the distribution histories after the conversion are listed in the information intervention apparatus order. In FIG. 10, if T1, T2, and T3 are arranged in time sequence, the distribution histories are listed in the order of T3, T1, and T2 at this point in time. Since the information distribution order would be difficult to understand without any change, the distribution histories after the conversion are resorted in the time order at step S104. The distribution histories after the conversion as shown in FIG. 10(B) are thus provided.

FIG. 12 is an illustration of an example of the analysis result of the tracing analysis section 23 in the first embodiment of the information processing system of the invention. It shows the analysis result as binary data. Such an analysis result can be easily found from the distribution histories held in the distribution history holding section 22 in the tracing center shown in FIG. 9. This process will be discussed according to the flowchart in FIG. 11.

At step S101, the user specifies information X to be traced, namely, the information with information identifier "679840-176." At step S102, the information X, namely, only the rows with the target information identifier "679840-176" in FIG. 9 are extracted, whereby the information on the first row in FIG. 9 is deleted and the three remaining rows are extracted.

In FIG. 9, the collection source apparatus identifier refers to the destination apparatus identifier. In the conversion process at steps S103–S105, first the column name of the collection source apparatus identifier in FIG. 9 is changed to the destination apparatus identifier and the column order is resorted to the order of the target information identifier, source apparatus identifier, destination apparatus identifier, and reception time. This results in representation equivalent to the description "Information X: A→B (T3)." At step S106, the rows are resorted in the reception time order.

When the description is represented as "A→B, C, D (T3)," if is separated as "A→B (T3)," "A→C (T3)," "A→D (T3)," it can be covered by the data structure as described above.

The analysis result thus found enables the user to know the following for each information:

What range the information flowed in (all-area tracing);

how the information flowed from one information intervention apparatus (forward tracing);

what the distribution route was until the information arrived at one information intervention apparatus (backward tracing);

where the source of the information is (location of source); and the like.

In addition to the location of an information distribution route as the algorithm of the tracing analysis section 23 as shown in FIG. 11, information concerning distribution, such as the number of times information has been distributed within a fixed time period; and monthly change in the information distribution amount between specific information intervention apparatuses, can be known. For the number of times information has been distributed within a fixed time period, the total number of distribution histories related to one information identifier within a fixed time period may be found. For the monthly change in the information distribution amount between specific information intervention apparatuses, only rows having the values of determined source and destination information intervention apparatuses are extracted and the number of items may be totaled every month.

Figure 13:
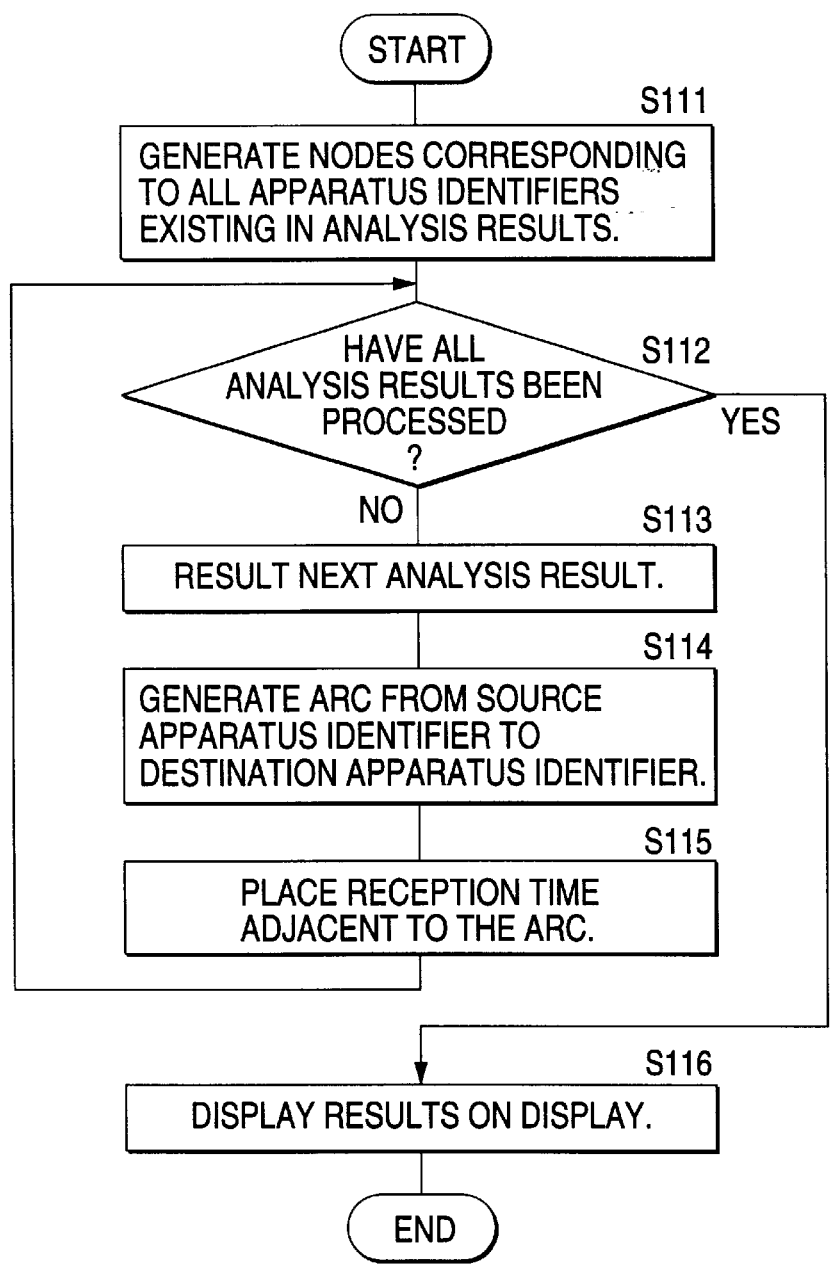
FIG. 13 is a flowchart to show an example of the operation of an analysis result display section in the first embodiment of the information processing system of the invention.

The distribution route information analyzed by the tracing analysis section 23 is displayed by the analysis result display section 24 in the form that can be understood by human beings like an illustration. FIG. 13 is a flowchart to show an example of the operation of the analysis result display section in the first embodiment of the information processing system of the invention. First, at step Sill, nodes corresponding to all apparatus identifiers existing in the analysis result are prepared. At step S112, whether all rows of the analysis result have been processed is determined. Steps S113–S115 are executed for unprocessed analysis result rows. At step S113, another analysis result row is selected. For the analysis result, an arc from the source apparatus identifier to the destination apparatus identifier is prepared at step S114, and the reception time is placed on the side of the arc at step S115. Upon completion of the arc preparation for all the analysis result, the result is displayed on a display, such as a CRT, at step S116.

The operation of the analysis result display section will be discussed specifically based on the analysis result shown in FIG. 10(B). First, at step Sill, four nodes corresponding to all apparatus identifiers existing in the analysis result, namely, A, B, C, and D are prepared. At step S114, an arc from A to C is prepared and time T1is placed on the side of the arc.

Likewise, an arc from C to D is prepared and time T2is placed on the side of the arc and an arc from A to B is prepared and time T3is placed on the side of the arc. Last, the result is displayed on the display at step S116.

Figure 14:
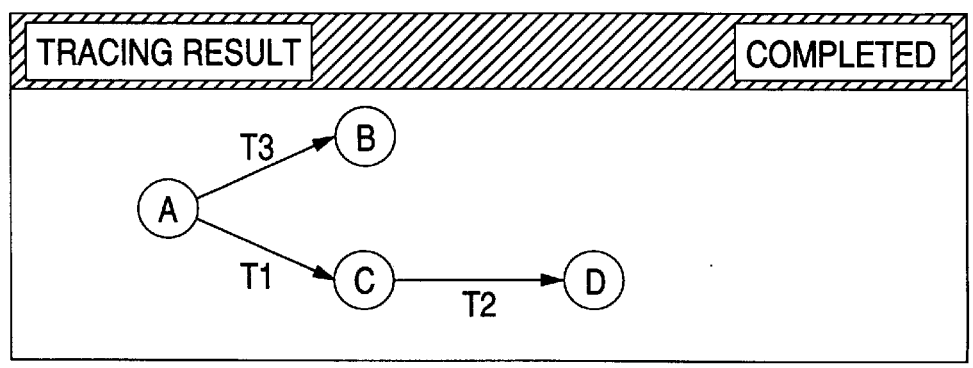
FIG. 14 is an illustration of an example of display produced by the analysis result display section in the first embodiment of the information processing system of the invention.

FIG. 14 is an illustration of an example of display produced by the analysis result display section in the first embodiment of the information processing system of the invention. Display, for example, as shown in FIG. 14 can be produced according to the nodes and arcs prepared as described above. In FIG. 14, the nodes are indicated by circles and the arcs are indicated by arrows. The time is displayed near each arrow. Such display enables the user to easily know the information distribution routes.

Second embodiment

Next, a second embodiment of the information processing system of the invention will be discussed. In the second embodiment, histories related to information prepared or changed by the user are also left, whereby change and preparation histories can also be traced.

The first embodiment assumes only that general users use information distributed by information distributors different from the users. Thus, it does not assume that general users prepare and distribute information. However, in the future, it seems that classification into information users and distributors will be meaningless and that an environment in which every information user is also a distributor will come. Then, the second embodiment provides an example of a tracing method meeting such an environment.

For this purpose, the configuration of the information intervention apparatus 1 and the algorithm of the tracing analysis section 23 in the tracing center 2 may be changed in the configuration of the first embodiment. Here, only the changes will be discussed.

Figure 15:
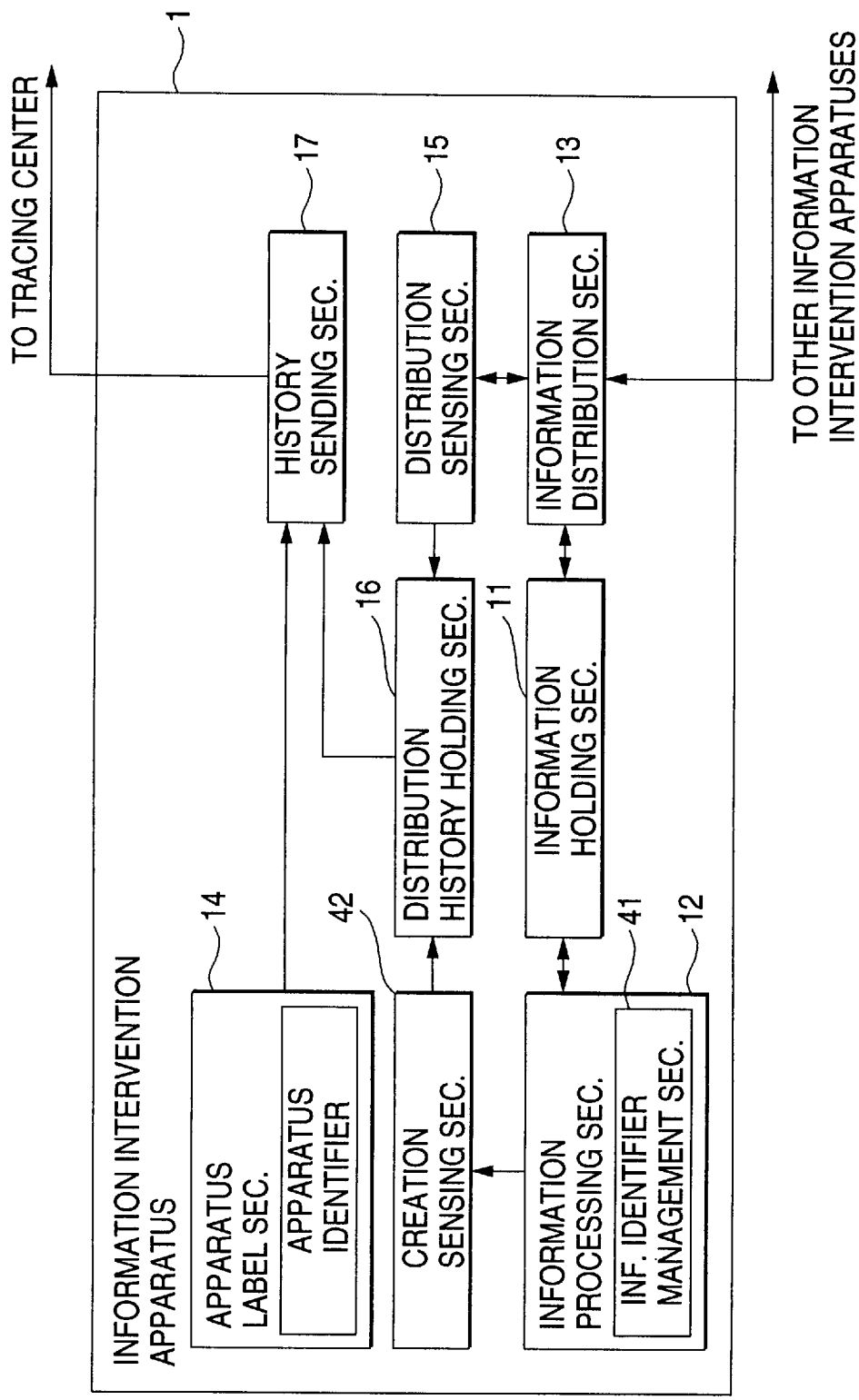
FIG. 15 is a block diagram of an information intervention apparatus to show a second embodiment of the information processing system of the invention.

FIG. 15 is a block diagram of an information intervention apparatus to show the second embodiment of the information processing system of the invention. Parts identical with or similar to those previously described with reference to FIGS. 1A and 1B are denoted by the same reference numerals in FIG. 15 and will not be discussed again. In FIG. 15, numeral 41 is an information identifier management section and numeral 42 is a creation sensing section. An information processing section 12 has the information identifier management section 41. When the user prepares new information or changes already existing information in the information processing section 12, the information identifier management section 41 gives a new information identifier to the information. It manages information identifiers so that they are not duplicate for each user or information intervention apparatus.

As an possible information identifier management method, for example, a combination of the apparatus identifier held in each information intervention apparatus 1 and a serial number given to information prepared or changed through the information intervention apparatus 1 is used as the information identifier of the information. For example, if the apparatus identifier is 6892678, it is combined with the serial numbers to information prepared or changed on the information intervention apparatus 1 to produce 6892678-1, 6892678-2, 6892678-3, . . . used as the information identifiers, whereby duplication of the information identifiers among the information intervention apparatuses can be avoided.

The information intervention apparatus 1 further includes the creation sensing section 42, which monitors the information processing section 12 and when information to which a new information identifier is given is prepared, senses it and stores a history of the event in a distribution history holding section 16 as an edit history. For example, if information with information identifier W is prepared at time T, the following edit history "created W at T"

is written into the distribution history holding section 16. If information with information identifier P is prepared based on information with information identifier Q at time T, the edit history "created P from Q at T"

is recorded. The recorded edit histories are collected together with distribution histories by a tracing center 2 as in the first embodiment.

FIG. 16 is an illustration of an example of distribution histories in the second embodiment of the information processing system of the invention. The edit histories are recorded in the distribution history holding section 16 together with distribution histories. In this case, the table structure in the distribution history holding section 16 shown in FIG. 7 needs to be extended. In fact, two fields of history type of distribution or edit and original information identifier for an edit history may be added. In the example shown in FIG. 16, "0" under the history type means a distribution history and "1" means an edit history. If the history type is "0," the entries on the row are similar to those in FIG. 7. If the history type is "1," it means an edit history. For preparation, namely, "created W at T," blank is shown under the original information identifier. For modification, namely, "created P from Q at T," the identifier of the original information is recorded under the original information identifier. In the example shown in FIG. 16, the second row is a modification history and the fourth row is a creation history. In this case, the source apparatus identifier and the original information identifier do not exist at the same time, thus may share the same field. In contrast, since the history type is seen depending on the presence or absence of a source apparatus identifier, the history type field can also be omitted.

Figure 17:
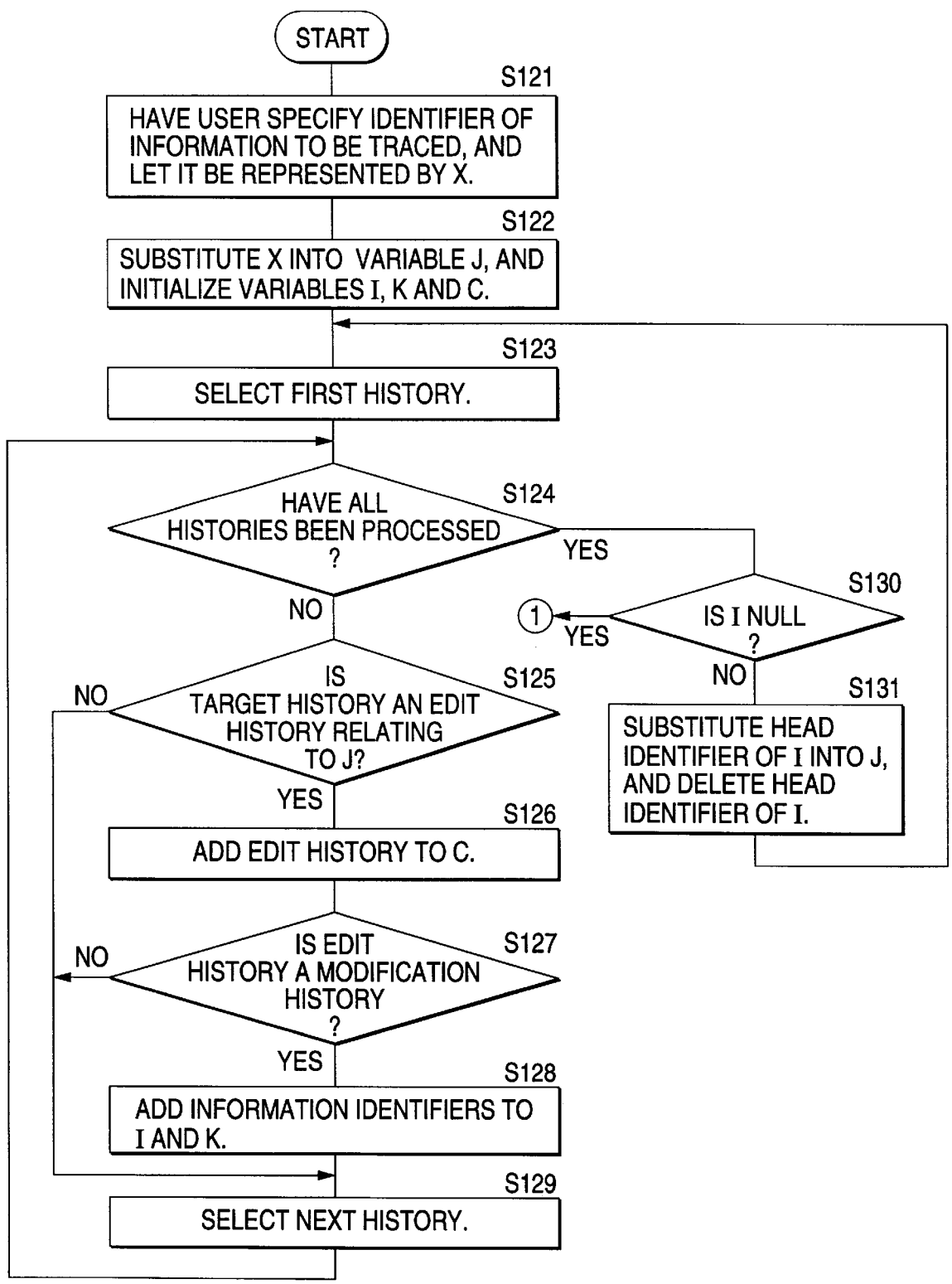
FIG. 17 is a flowchart to show an example of the operation of a tracing analysis section in the second embodiment of the information processing system of the invention.
Figure 18:
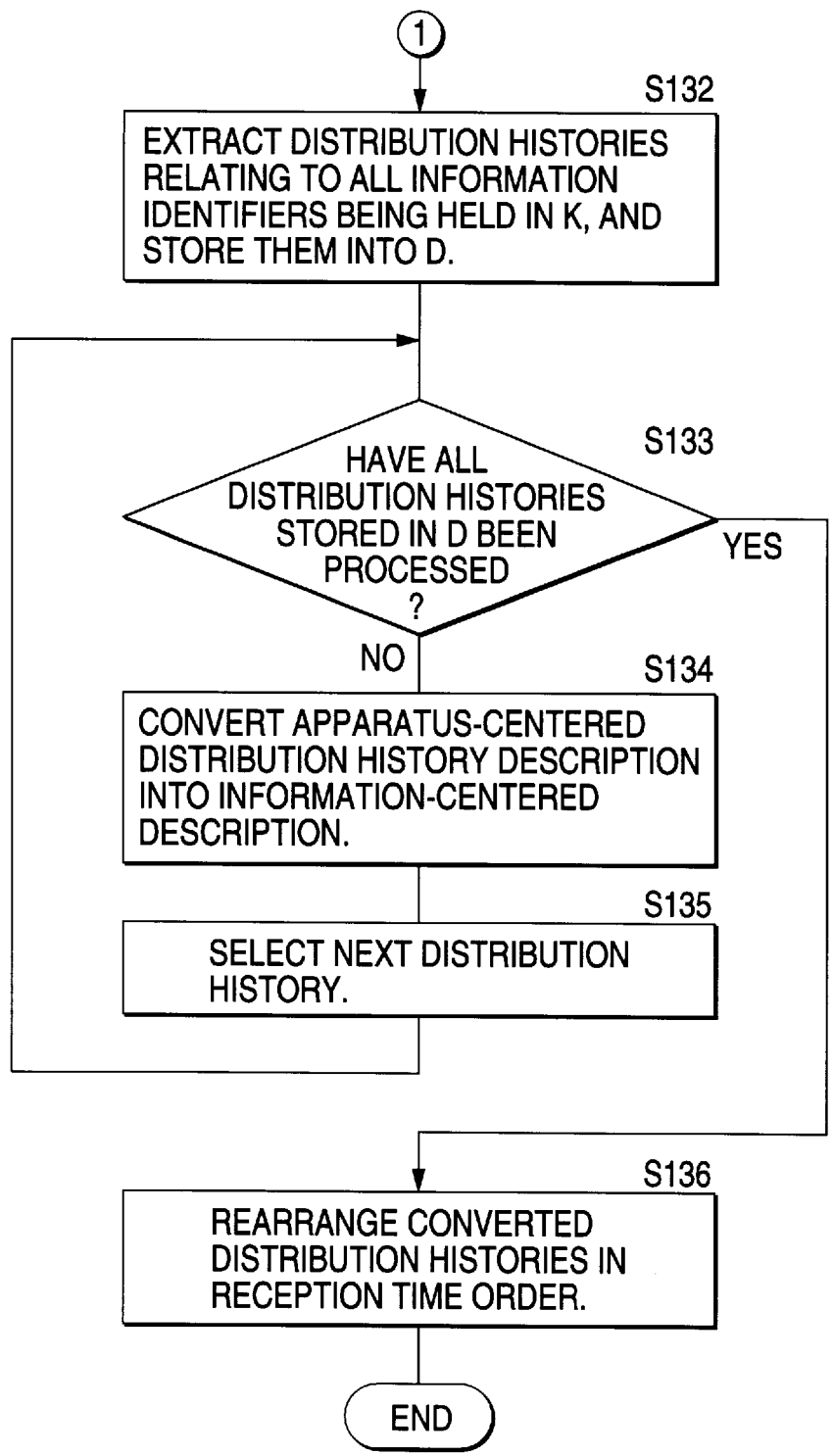
FIG. 18 is a flowchart to show an example of the operation of a tracing analysis section in the second embodiment of the information processing system of the invention (continued)

In the tracing center 2, edit histories are mixed in the distribution histories collected from the information intervention apparatuses 1. Thus, the tracing center 2 also needs a change responsive to it. Specifically, a change occurs in the algorithm of a tracing analysis section 23 for analyzing histories. FIGS. 17 and 18 are flowcharts to show an example of the operation of the tracing analysis section 23 in the second embodiment of the information processing system of the invention. At step S121, the user, etc., is prompted to specify the identifier of the information to be traced. Here, assume that the specified information identifier is X.

At steps S122–S131, only the edit histories related to the information to be traced are extracted. If a description indicating a modification history indicated by "created * from *" where "*" may be any character string exists in the edit histories, it is assumed that the original information identifier is also specified. Such a process is repeated until all modification histories containing the description "created * from *" are found. The extracted edit histories can be converted into descriptions centering on information as to when the information was prepared or modified by whom from what information.

At step S122, information identifier X is assigned to variable J and variables I, K, and C are initialized. The current information identifier in processing is held in variable J, original information identifiers derived from the current information identifier are held in variable K, edit histories are held in variable C, and distribution histories are held in variable D. Variable I is used as an intermediate variable for performing processing for all information identifiers derived during the processing.

At step S123, the first history is selected. At step S124, whether all histories have been processed is determined. If an unprocessed history exists, whether or not the selected history is the edit history related to the information identifier stored in the variable J is determined at step S125. If it is the edit history related to the variable J, the edit history is added to the variable C at step S126. Whether or not the edit history is a modification history containing the representation "created * from *" is determined at step S127. If it is a modification history, information identifiers corresponding to "*" in the modification history are added to the variables I and K at step S128. Another history is selected at step S129 and control returns to step S124 at which processing is performed for the history.

If the selected history is not edit information relating to the variable J at step S125, or if the edit history is not judged to be a modification history at step S127, the next history is selected at step S127 and the control returns to step S124.

If it is determined at step S124 that all histories have been processed, whether or not the variable I is null is determined at step S130. If the variable I is not null, it means that an information identifier extracted from an unprocessed edit history exists. At step S131, for example, the top one is taken out from the information identifiers stored in the variable I and is assigned to the variable J and the taken out information identifier is deleted from the variable I. Control returns to step S123 and edit history processing is performed as if the taken out information identifier were specified. Thus, the information identifiers of the information from which the information having the information identifier specified by the user at step S121 is derived and the information resulting from modifying the information can also be obtained. When it has been determined at step S130 that the variable I is null, the information identifiers are stored in the variable K.

When it is determined at step S130 that the variable I is null, distribution histories related to all information identifiers held in the variable K are extracted and stored in the variable D at step S132. At steps S133–S135, the distribution histories stored in the variable D are converted from the descriptions for each apparatus into those centering on information as to when the information was distributed from which apparatus to which apparatus. This process is similar to the conversion process at steps S103–S105 in FIG. 11. Upon completion of the conversion process of the description form for all the distribution histories stored in the variable D, the distribution histories subjected to the conversion process are resorted in the reception time order at step S136.

Figures 19, 20:
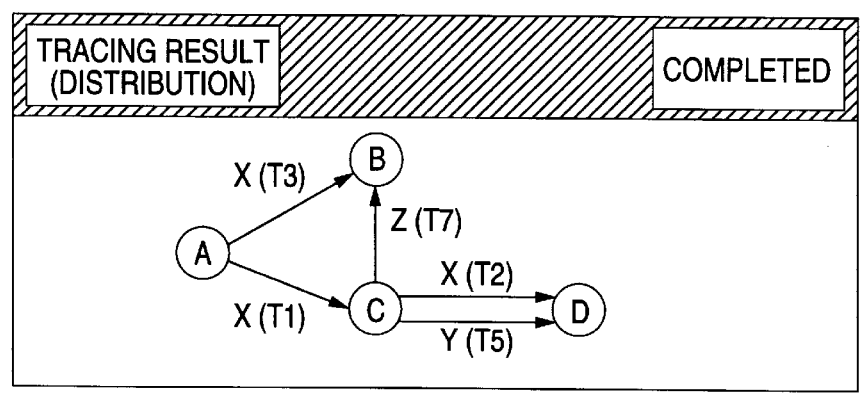
FIG. 19 is an illustration of an example of the operation of the tracing analysis section in the second embodiment of the information processing system of the invention.
FIG. 20 is an illustration of an example of display of distribution trace information prepared by an analysis result display section in the second embodiment of the information processing system of the invention.

FIG. 19 is an illustration of an example of the operation of the tracing analysis section in the second embodiment of the information processing system of the invention. The operation of the tracing analysis section 23 shown in FIGS. 17 and 18 will be discussed with the specific example shown in FIG. 19. Now, assume that histories as shown in FIG. 19(A) are collected from the information intervention apparatuses. Here, assume that T0, T1, . . . , T7 are in time sequence. In the description to follow, assume that the user wants to know the distribution route of information Z.

First, at step S121, the user specifies identifier Z of the information to be traced. Next, at step S122, the information identifier Z is stored in the variable J and the variables I, K, and C are initialized, then steps S124–S129 are executed for each history. The modification history "created Z from Y at T6" can be found on the third row under the information intervention apparatus C as the edit histories related to the information identifier z (beginning with "created Z"). It means that Z was prepared at time T6 from Y. This history is stored in the variable C at step S126. Since it contains the modification history of the information identifier Z, namely, the description "created * from *," the information identifier Y is added to the variables I and K at step S128.

At step S130, the information identifier Y is stored in the variable I. Thus, at step S131, it is stored in the variable J and deleted from the variable I. Control returns to step S123 and further the edit history related to the information identifier Y is gathered. The edit history "created Y from X at T4" can be found under the information intervention apparatus C. Thus, it is also added to the variable C at step S126. Since the edit history is also a modification history of the pattern "created * from *," the information identifier X is added to the variables I and K at step S128.

At step S130, the information identifier X is stored in the variable I. Thus, at step S131, it is stored in the variable J and deleted from the variable I. Control returns to step S123 and the edit history related to the information identifier X is retrieved. The preparation history "created X from X at T0" can be found under the information intervention apparatus A. It is added to the variable C at step S126. Since the preparation history does not contain "from," it means that original information does not exist. Thus, step S128 is not executed. At step S130, the variable I is null and the information identifier gathering process from the edit histories is now complete.

If one information is prepared from more than one original information item, its edit history is recorded like "created X from a, b, c," thus each of the identifiers to the right of "from" may be stored in the variables I and K and steps S123–S129 may be repeated.

Each edit history can be rewritten as a description centering on information as to when editing was performed from what information to what information with which information intervention apparatus. For example, the history of the information intervention apparatus C, "created Y from X at T4," can be rewritten as the form "X→Y (C, T4)." Both representations have the same meaning (information Y was modified based on information X at time T4 with the information intervention apparatus C). If the information is prepared from information items M and N, the description may be converted into "M, N→Y (C, T4)." The edit history to be converted is stored in the variable C. The conversion result is shown on the top of FIG. 19(B). Edit trace information can be thus prepared.

Next, at step S132, distribution histories are extracted for each of all information identifiers appearing in the modification histories gathered in the variable K. In the example, the distribution histories related to information X, Y, and Z are extracted. Next, at steps S133–S135, each extracted distribution history is converted into a description centering on information as to when the information was distributed from which apparatus to which apparatus. This conversion method is similar to the method described in the first embodiment and therefore will not be discussed again. Last, at step S136, the distribution information subjected to the conversion are resorted in the time order. As a result, trace information of the information X, Y, and Z is provided as shown in the second to fourth boxes of FIG. 19(B).

Next, an analysis result display section 24 displays the tracing result information. The second embodiment differs from the first embodiment in that two types of trace information for editing and distribution are provided and that in the distribution trace information, distribution histories may be represented at the same time for more than one information item.

FIG. 20 is an illustration of an example of display of distribution trace information prepared by the analysis result display section 24 in the second embodiment of the information processing system of the invention. The tracing result of only a single information item is displayed in the first embodiment shown in FIG. 14. However, the analysis result display section 24 in the second embodiment displays trace information of more than one information item, as shown in FIG. 20. Therefore, the information items need to be distinguished from each other; the information type, such as "X (T3)" or "Y (T5)," is shown on the side of each arrow connecting information intervention apparatuses. This is an example; different types of lines such as broken and dashed lines or colors may be used to distinguish the information items. Of course, the user may select trace information display for only a single information item as in the first embodiment. In this case, the tracing result as shown in FIG. 14 may be displayed as in the first embodiment.

Figure 21:
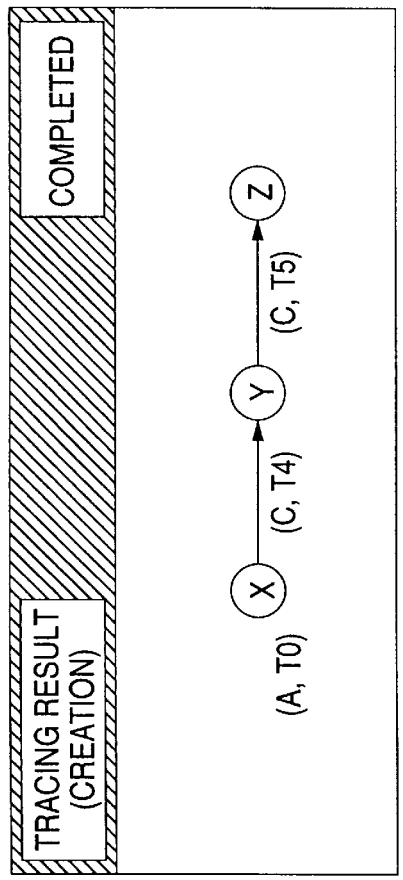
FIG. 21 is an illustration of an example of display of edit trace information prepared by the analysis result display section in the second embodiment of the information processing system of the invention.

FIG. 21 is an illustration of an example of display of edit trace information prepared by the analysis result display section in the second embodiment of the information processing system of the invention. The example display shown in FIG. 21 indicates where and how information was processed. It means that information X was prepared at time T0 in information intervention apparatus A, that information Y was prepared based on information X at time T4 in information intervention apparatus C, and that information Z was prepared based on information Y at time T6 in information intervention apparatus C.

In the second embodiment, we have discussed taking also histories about new information edit, namely, "preparation" and "modification" of information. In addition, histories related to "use" of information may be taken. For example, such a history for use of information by one application may be recorded, whereby the information can be traced as to where it was used by what application. A history for "copying" of information may also be taken, whereby the information can be traced as to where it was copied.

Third embodiment

Figure 22:
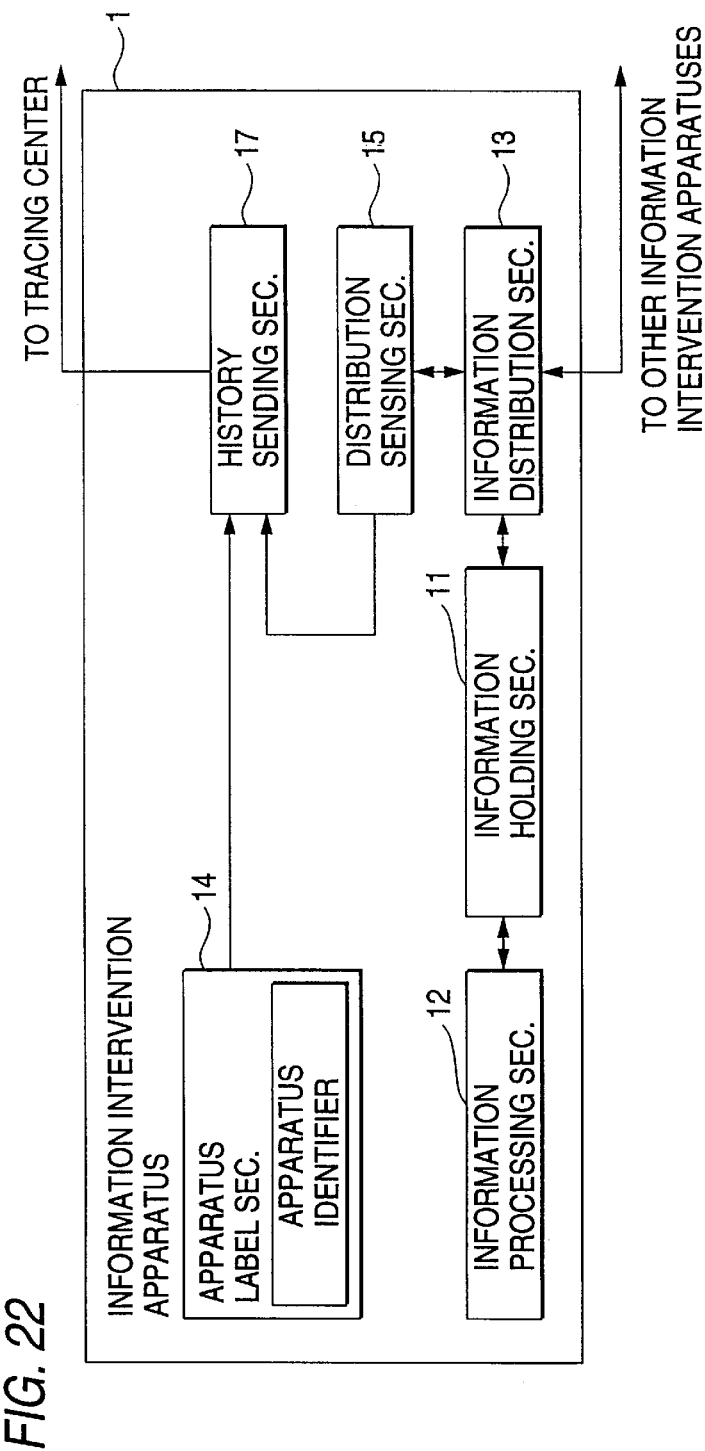
FIG. 22 is a block diagram to show an information intervention apparatus in a third embodiment of the information processing system of the invention.

Next, a third embodiment of the information processing system of the invention will be discussed. In the first and second embodiments, We have discussed the examples in which each information intervention apparatus 1 records operation histories on information. However, since distribution information needs only to be able to be collected finally in the tracing center 2, logically histories may be held anywhere. For example, each information intervention apparatus 1 may have no distribution history holding section 16 and send histories to the tracing center 2 one by one when operation requiring histories is performed. FIG. 22 is a block diagram to show an information intervention apparatus in a third embodiment of the information processing system of the invention. Parts identical with or similar to those previously described with reference to FIGS. 1A and 1B are denoted by the same reference numerals in FIG. 22. The information intervention apparatus 1 in the third embodiment has the same configuration as that in the first embodiment except that it has no distribution history holding section and that information provided from a distribution sensing section 15 is sent directly to a history sending section 17 because the information intervention apparatus 1 transmits histories one by one.

Figure 23:
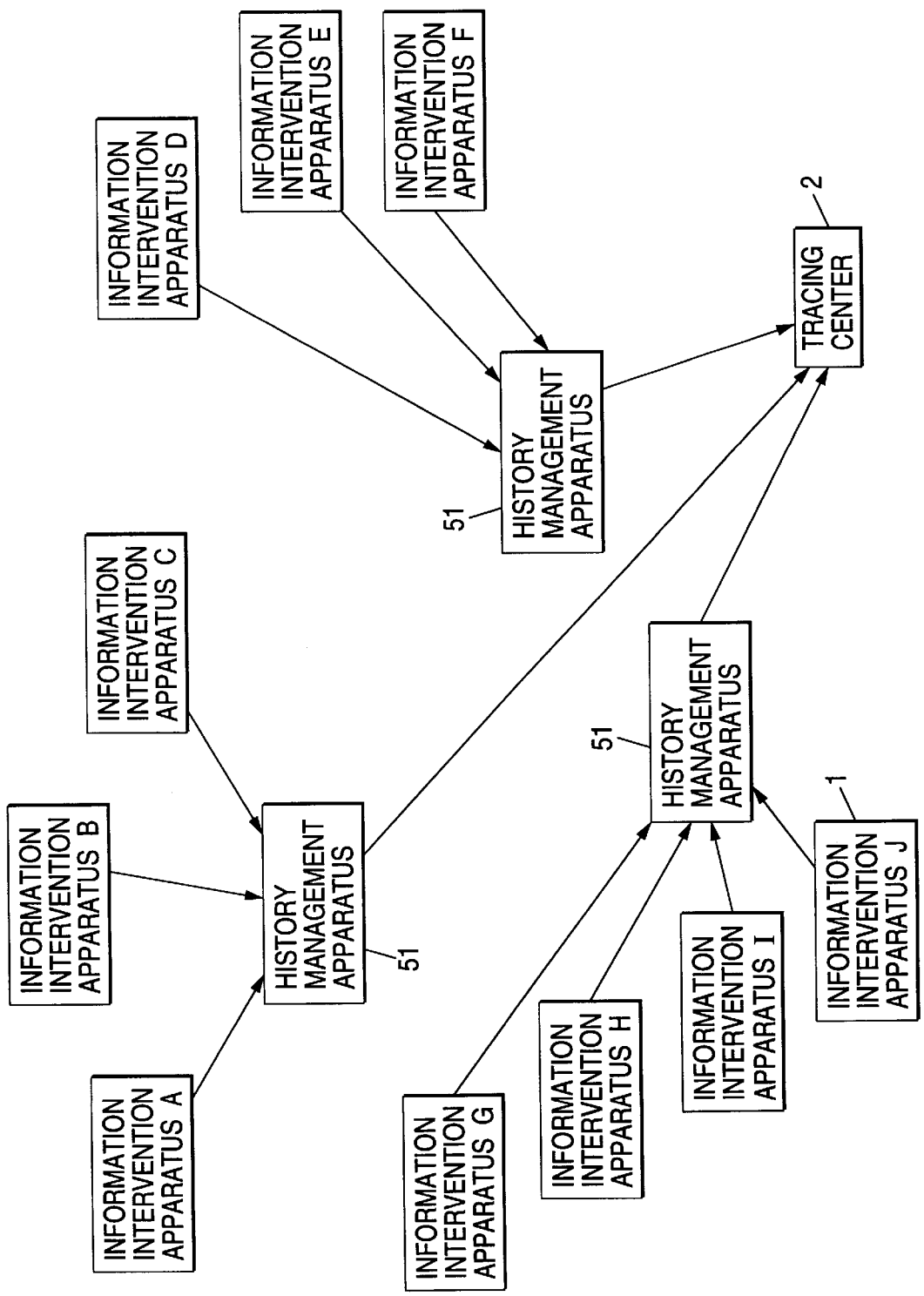
FIG. 23 is an illustration of an example of distribution history collection flows in the third embodiment of the information processing system of the invention.

FIG. 23 is an illustration of an example of distribution history collection flows in the third embodiment of the information processing system of the invention. In the figure, numeral 51 is a history management apparatus. Since history information logically may exist anywhere as described above, histories can be collected and held in units, for example, for each local area network. The history management apparatus 51 is a server for managing histories; it collects, holds, and manages all histories in a unit such as a single network. Information in the history management apparatuses 51 is transmitted to a tracing center 2. In doing so, the tracing center 2 need not receive distribution histories one by one from all information intervention apparatuses 1.

Figure 24:
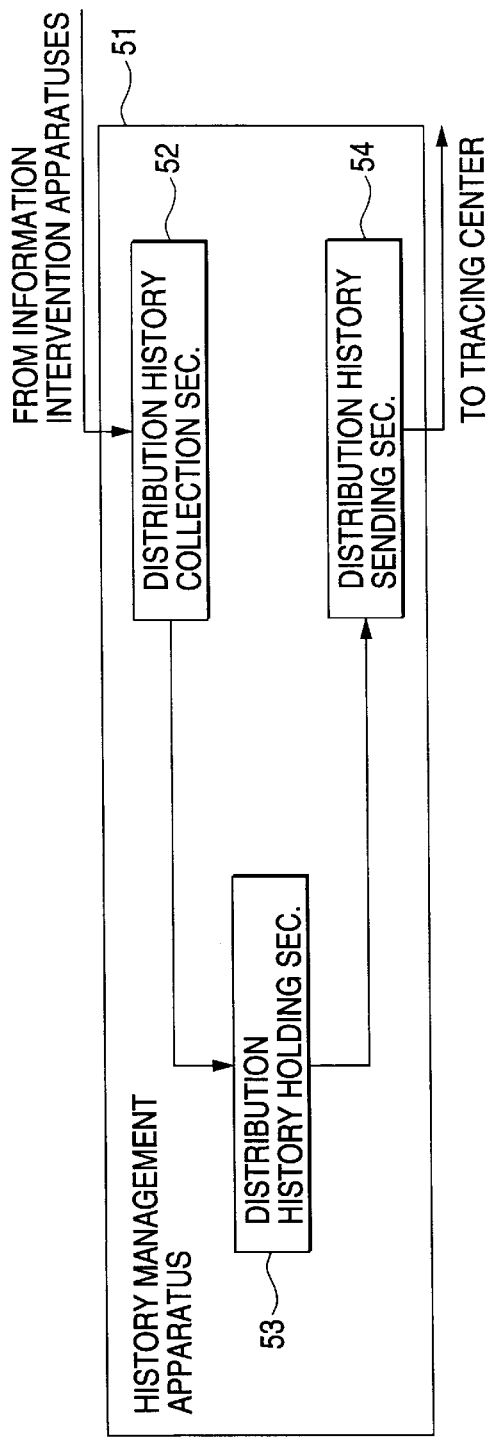
FIG. 24 is a block diagram to show an example of a history management apparatus in the third embodiment of the information processing system of the invention.

FIG. 24 is a block diagram to show an example of the history management apparatus in the third embodiment of the information processing system of the invention. In the figure, numeral 52 is a distribution history collection section, numeral 53 is a distribution history holding section, and numeral 54 is a distribution history sending section. As shown in FIG. 23, the history management apparatus 51, which exists between the information intervention apparatuses 1 and the tracing center 2, gathers and holds history information occurring in the information intervention apparatuses 1 and sends the information to the tracing center 2 at one timing. Therefore, it has the functions of the distribution history holding section 16 and the history sending section 17 of the information intervention apparatus 1 and the distribution history collection section 21 in the tracing center 2 in the first embodiment.

The distribution history collection section 52 collects histories from the information intervention apparatuses 1 and stores them in the distribution history holding section 53, which holds and manages the collected histories. The distribution history sending section 54 sends the histories stored in the distribution history holding section 53 to the tracing center 2.

As the history management apparatuses 51 are used, the history sending section 17 of the information intervention apparatus 1 shown in FIG. 22 sends histories to the history management apparatus 51 corresponding to the information intervention apparatus 1. The configuration of the tracing center 2 is the same as the configuration shown in FIG. 1B in the first embodiment, for example, but the distribution history collection section 21 collects histories from the history management apparatuses 51.

The apparatus identifiers of the history management apparatuses 51 are not indispensable. However, when a collection instruction is issued from the tracing center 2 to the history management apparatuses 51, it is necessary to identify the history management apparatuses 51, thus the history management apparatuses 51 may be provided with apparatus identifiers. Identifiers are given to the history management apparatuses 51, whereby the correspondence between the information intervention apparatuses and the history management apparatuses managing the histories can be grasped.

Although one history management apparatus 51 is provided between a group of the information intervention apparatuses 1 and the tracing center 2 in FIG. 23, more than one history management apparatus 51 can also be provided. For example, for several history management apparatuses 51, an additional history management apparatus 51 having control over them can also be provided for a hierarchical system configuration.

Fourth embodiment

Next, a fourth embodiment of the information processing system of the invention will be discussed. In the first to third embodiments discussed so far, identifiers are given to information or information intervention apparatuses. This method is sufficient for information exchange connected by networks. However, information exchange disconnected from a network, for example, information distribution via information media disconnected from a network such as floppy disk may often be executed. In this case, a problem is a broken link between the source and destination when information is distributed via information media. The source party can write information onto media without determining any destination and pass to nonspecific destinations. The information receiving party (destination) cannot locate the source of the information simply by seeing the information.

To solve the problem, the following three methods can be used:

(1) Information is provided with a distribution history holding section for writing a distribution history consisting of a source apparatus identifier and time of day;

(2) A medium is provided with a distribution history holding section for writing a distribution history consisting of a source apparatus identifier and time of day; and (3) A medium identifier is given to a medium and when recording a distribution history, the source and destination parties use the medium identifier instead of the apparatus identifier.

Items (1) and (2) differ only in distribution history holding location. How to provide these methods will be discussed.

Figure 25:
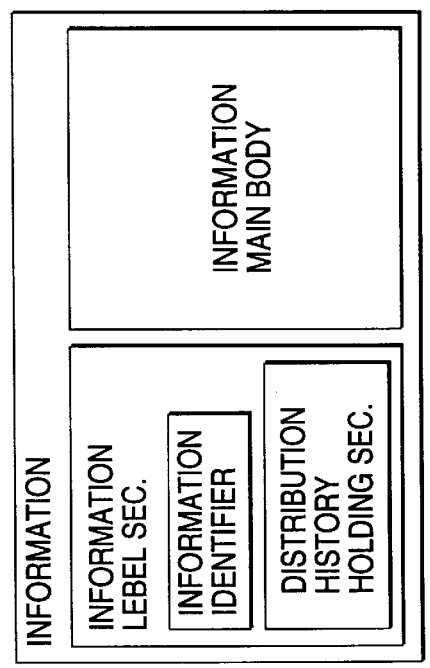
FIG. 25 is an illustration of an example of the format of information in the fourth embodiment of the information processing system of the invention.
Figure 26:
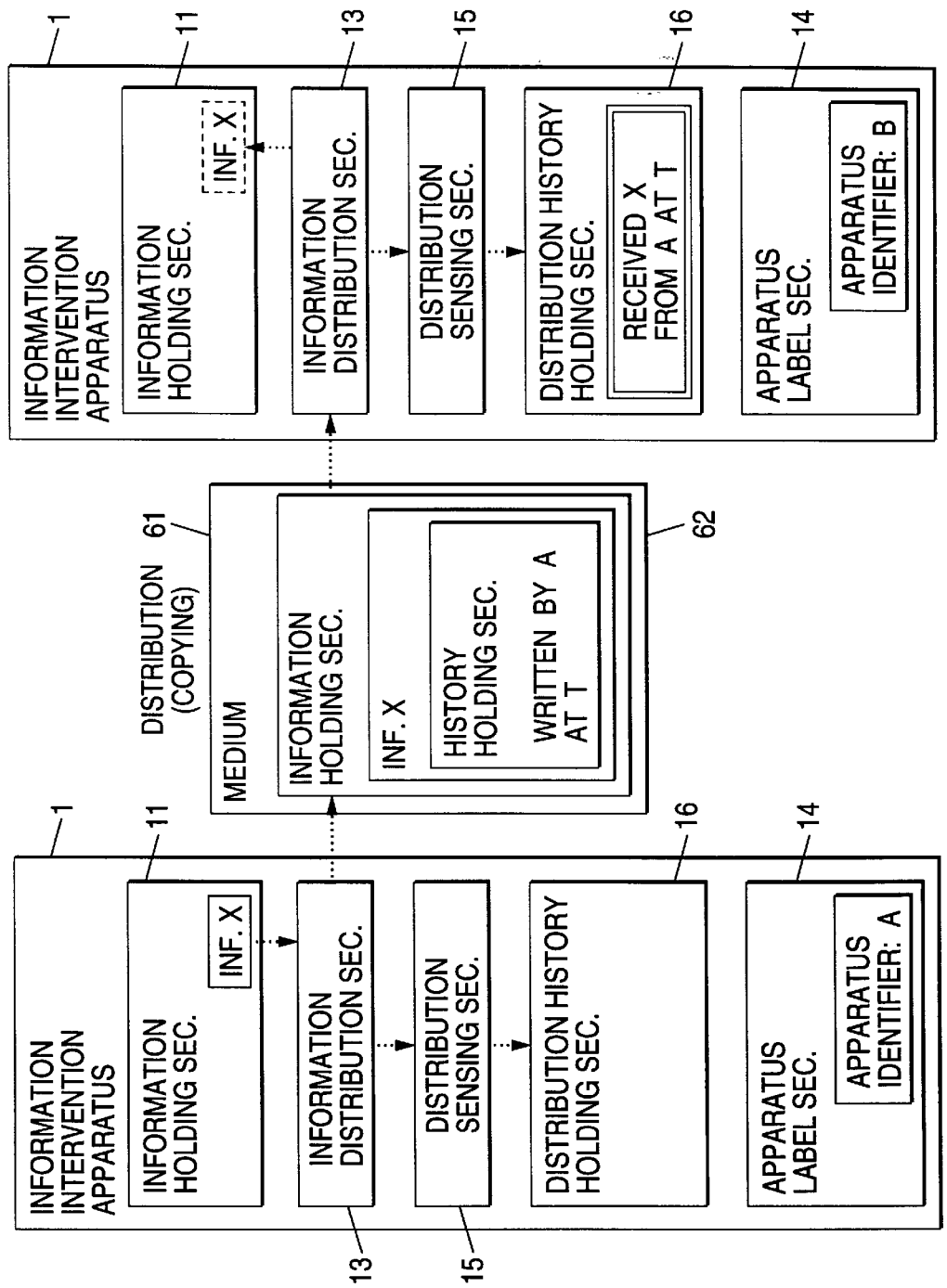
FIG. 26 is an illustration of an example of recording histories in the information intervention apparatuses in the fourth embodiment of the information processing system of the invention.

First, the method of providing information with a distribution history holding section for writing a distribution history consisting of a source apparatus identifier and time of day will be discussed. FIG. 25 is an illustration of an example of the format of information in the fourth embodiment of the information processing system of the invention. FIG. 26 is an illustration of an example of recording histories in the information intervention apparatuses in the fourth embodiment of the information processing system of the invention. In the figure, numeral 61 is a medium and numeral 62 is an information holding section. The medium 61 is used to distribute information. Distributed information is stored in the information holding section 62 of the medium 61. In the example, the information held in the information holding section 62 is provided with a distribution history holding section in an information label section of the information, as shown in FIG. 25.

As shown in FIG. 26, when information x is recorded in the information holding section 62 of the medium 61, a distribution history in the form "written by A at T"

is written into the distribution history holding section in the information label section of the information X by source information intervention apparatus A, where A is the apparatus identifier of the source information intervention apparatus and T is the time of day. When such information is received at destination information intervention apparatus B, where the information is distributed from can be known by seeing the distribution history recorded with the information. Then, the history "received X from A at T"

is written into a distribution history holding section 16 in the destination information intervention apparatus, where time T' (>T) is the time of day at which the information was received at the destination. It may be the storage time T at the source, or both times may be recorded in the history. The subsequent operation is similar to that in the above-described embodiments.

After the information is received at the destination and the history is recorded in the distribution history holding section 16 of the destination apparatus, the distribution history holding section contents held in the information become unnecessary and may be erased. Alternatively, assuming that the medium 61 is again distributed to another information intervention apparatus, the distribution history may be left intact until the information is erased.

Figure 27:
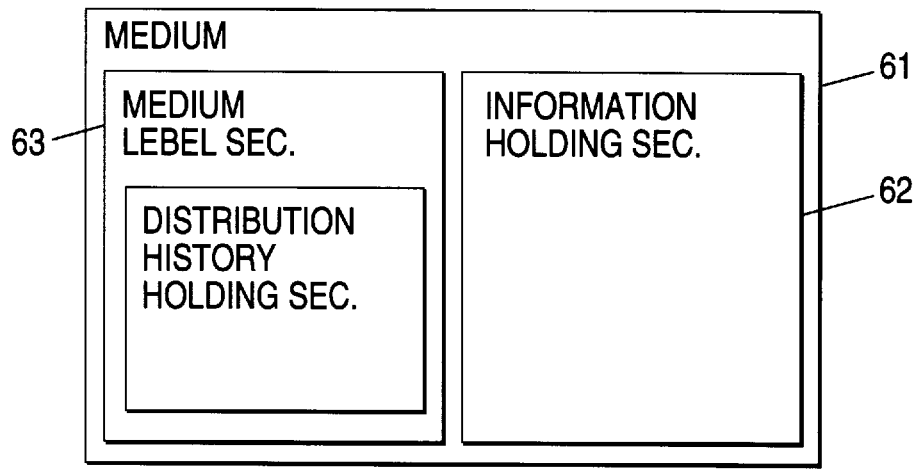
FIG. 27 is an illustration of an example of the format of an medium in the fourth embodiment of the information processing system of the invention.

Next, the method of providing a medium with a distribution history holding section for writing a distribution history consisting of a source apparatus identifier and time of day will be discussed. FIG. 27 is an illustration of an example of the format of an medium in the fourth embodiment of the information processing system of the invention. FIG. 28 is an illustration of another example of recording histories in the information intervention apparatuses in the fourth embodiment of the information processing system of the invention. In the figure, numeral 61 is a medium, numeral 62 is an information holding section, and numeral 63 is a medium label section. To hold a history in the medium 61, the information holding section 63 is made in the medium 61 and the distribution history holding section is provided in the information holding section 63, as shown in FIG. 27. Information is held in the information holding section 62 in the medium 61.

As shown in FIG. 28, when information X is recorded on the medium 61, the distribution history "X was written by A at T"

is written into the distribution history holding section in the medium label section 63 of the medium 61 by source information intervention apparatus A, where X is an information identifier, A is the apparatus identifier of the source information intervention apparatus, and T is the time of day. When the information X is received at destination information intervention apparatus B, where the information is distributed from can be known by seeing the distribution history recorded on the information, whereby the history "received X from A at T'"

is written into a distribution history holding section 16 in the destination information intervention apparatus, where time T' (>T) is the time of day at which the information was received at the destination. It may be the storage time T at the source, or both times may be recorded in the history. The subsequent operation is similar to that in the above-described embodiments.

Figure 29:
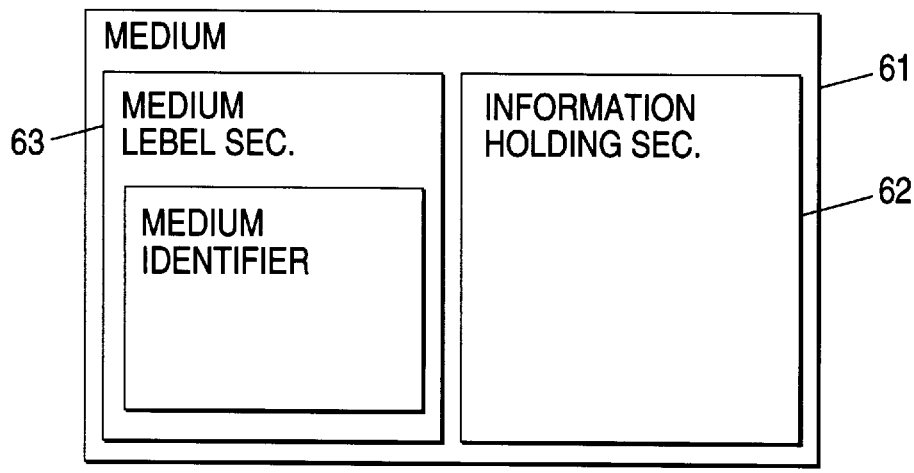
FIG. 29 is an illustration of another example of the format of an medium in the fourth embodiment of the information processing system of the invention.
Figure 30:
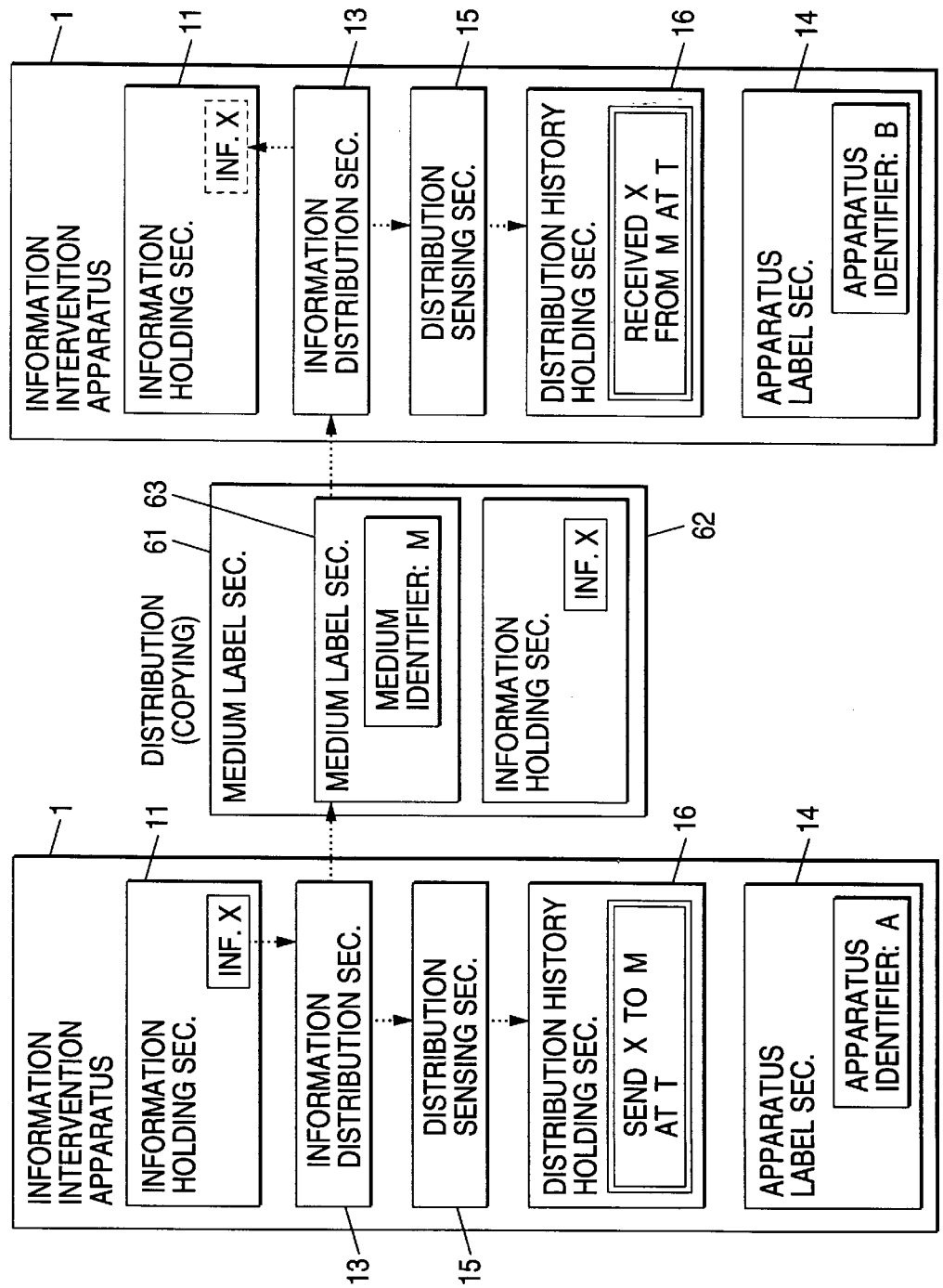
FIG. 30 is an illustration of still another example of recording histories in the information intervention apparatuses in the fourth embodiment of the information processing system of the invention.

Next, the tracing method via media by giving a medium identifier to a medium and using the medium identifier instead of the apparatus identifier when recording a distribution history at the source and destination parties will be discussed. FIG. 29 is an illustration of another example of the format of an medium in the fourth embodiment of the information processing system of the invention. FIG. 30 is an illustration of still another example of recording histories in the information intervention apparatuses in the fourth embodiment of the information processing system of the invention. Parts identical with similar to those previously described with reference to FIGS. 27 and 28 are denoted by the same reference numerals in FIGS. 29 and 30. As shown in FIG. 29, to hold a medium identifier in a medium 61, a medium label section 63 is made in the medium 61 and the identifier is held in the medium label section 63.

FIG. 30 shows how to record distribution histories in the example. To provide the medium 61 with the medium identifier, distribution histories must be recorded at both source and destination parties. When storing information X on the medium 61 having the medium identifier M, source information intervention apparatus A writes the following record into its distribution history holding section 16:

"send X to M at T"

This record means that information X was sent to (written onto) medium M at time T.

On the other hand, when receiving the information x written on the medium M, destination information intervention apparatus B writes the following distribution history into its distribution history holding section 16:

"received X from M at T'"

This distribution history means that information X was received from medium M at time T'.

Thus, both source and destination information intervention apparatuses A and B hold the distribution histories, whereby both apparatuses can be related by the medium identifier. At the tracing center 2 receiving the distribution histories from both source and destination information intervention apparatuses A and B, the distribution histories are collated with each other, whereby the fact that the information intervention apparatus A passed the information X via the medium M to the information intervention apparatus B can be found. At the time, if both apparatuses do not have the distribution histories, they cannot be related to each other.

For example, in FIG. 30, the distribution histories collected to the tracing center 2 are as follows:

Apparatus A: send X to M at T

Apparatus B: received X from M at T'

A tracing analysis section 23 in the tracing center 2 converts them into:

Information X: A→M (T) M→B (T')

whereby the fact that the information X was distributed from the information intervention apparatus A via the medium M to the information intervention apparatus B is seen. For example, the algorithm of the tracing analysis section 23 as shown in FIG. 11 in the first embodiment can be used as the algorithm for the process.

When information is copied from one medium to another, the coping should always be executed on an information intervention apparatus, thus the distribution history may be left on the information intervention apparatus executing the copying.

Fifth embodiment

Next, a fifth embodiment of the information processing system of the invention will be discussed. In the embodiments we have discussed, information is provided with an information label section in which its information identifier is held. However, the information identifier need not necessarily be held in the information; means for identifying the information needs only to be provided as a result. For example, it can be provided by using an information identifier calculation section using a function, such as a Hash function, based on the entire information for calculation for using a found Hash value as the information identifier of the information. The information identifier is not explicitly held, whereby the need for adding the information label section to the information is eliminated and such a technique for encrypting the information label section and information main body so that they are not separated from each other becomes unnecessary.

Figure 31A:
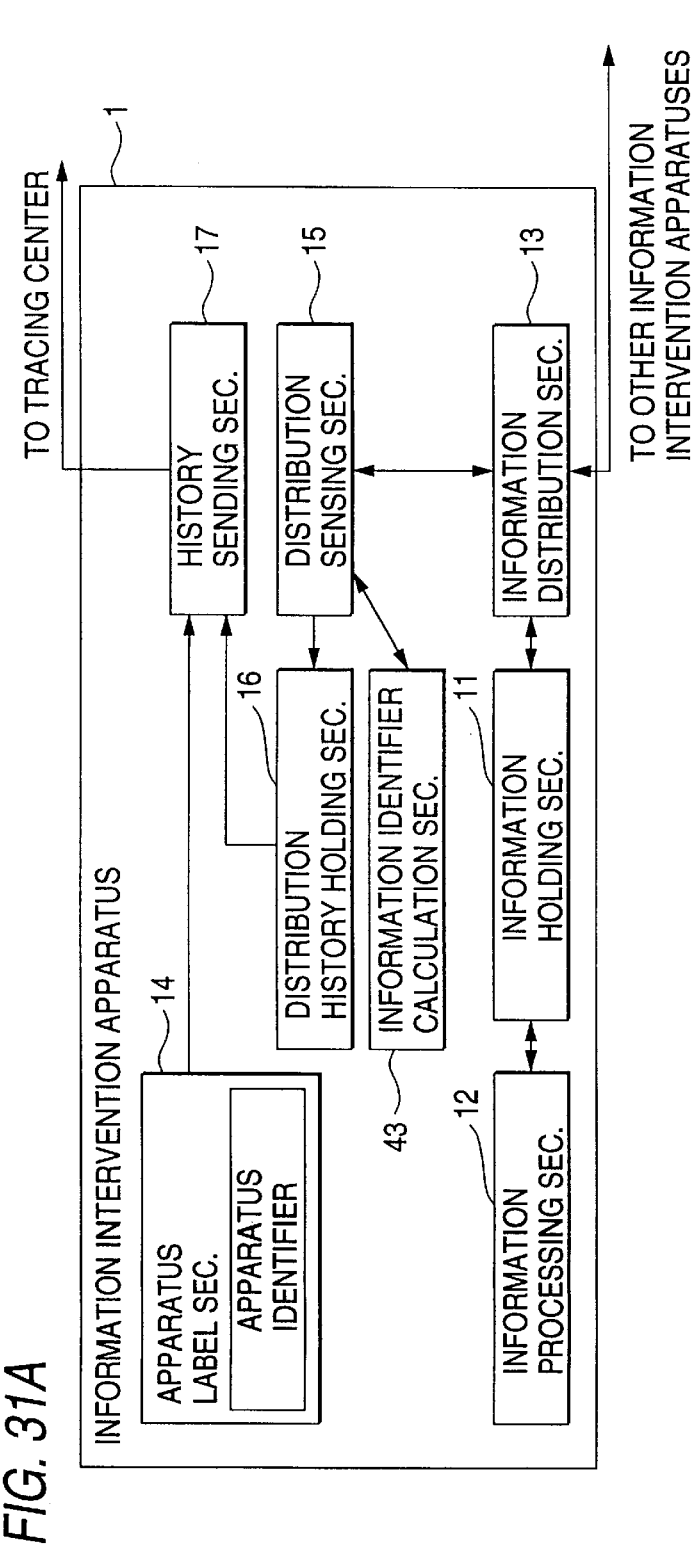
FIGS. 31A and 31B are block diagrams to show the fifth embodiment of the information processing system of the invention.
Figure 31B:
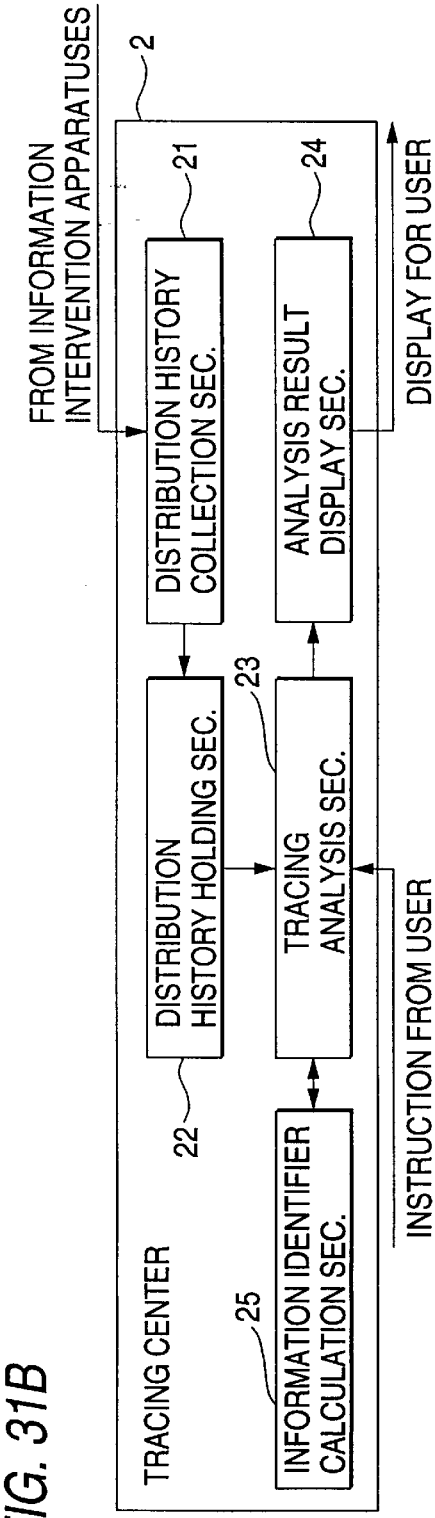
Figure 32:
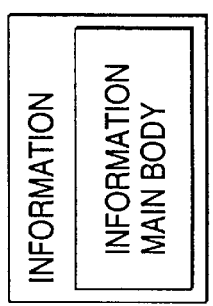
FIG. 32 is an illustration of an example of the format of information in the fifth embodiment of the information processing system of the invention.

FIGS. 31A and 31B are block diagrams to show the fifth embodiment of the information processing system of the invention. FIG. 32 is an illustration of an example of the format of information in the fifth embodiment of the information processing system of the invention. Parts identical with similar to those previously described with reference to FIGS. 1A and 1B are denoted by the same reference numerals in FIGS. 31A and 31B and will not be discussed again. In FIG. 31A and 31B, numerals 25 and 43 are information identifier calculation sections. The embodiment is provided by adding the information identifier calculation sections to the configuration of the first embodiment. Of course, to provide the fifth embodiment, the information identifier calculation sections can also be added to the configuration of any other embodiment.

As shown in FIG. 31A, the information identifier calculation section 43 is disposed in an information intervention apparatus 1. When sensing information distribution, a distribution sensing section 15 calls the information identifier calculation section 43 and gets an information identifier of the distributed information. As shown in FIG. 31B, the information identifier calculation section 25 is disposed in a tracing center 2. For example, when the user specifies information to be traced, a tracing analysis section 23 calls the information identifier calculation section 25, gets an information identifier of the specified information, and analyzes distribution histories of the information. The information main body of the distributed information does not require an information label section. As shown in FIG. 32, the information in the embodiment may constituted only of the information main body.

By providing the information identifier calculation sections, the processing contents of the distribution sensing section 15 and the tracing analysis section 23 are changed so as to call the information identifier calculation section 43 or 25. The internal processing step contained in the distribution sensing section 15 and the tracing analysis section 23, "read information identifier contents from information label section," may be changed to "pass information main body to information identifier calculation section and use returned result as information identifier."

The information identifier calculation sections 25 and 43 will be furthermore discussed. The information identifier calculation section 25 (43) has a role of calculating an information identifier from the information main body passed from the distribution sensing section 15 (tracing analysis section 23) and returning a value of the information identifier thereto. It holds a unidirectional Hash function for calculating an information identifier from the information main body contents. When receiving the information main body from the distribution sensing section 15 (tracing analysis section 23), the information identifier calculation section 25 (43) uses the Hash function based on the contents of the information main body to generate a new information identifier of the information, and returns the information identifier to the calling party.

The unidirectional Hash function is a function for converting a bit string of any length into a bit string of a certain length, and has a feature of scarcely outputting the same value if different bit strings are input. It is often used with cryptographic theories, and has a feature of outputting different values if data is compressed to a certain length and input data is different. This feature can be used to identify information in the embodiment. For example, according to Eiji Okamoto, "Angou Riron Nyumon (Introduction to Cryptographic Theories)," Kyoritsu Shuppan Co., Ltd., pp.138–140, 1993, an example of a specific has function is described. According to the book, SHA (secure Hash algorithm) is a standard proposal of the unidirectional Hash function indicated by Standard Bureau of the U.S. Department of Commerce (NIS). The SHA outputs 160 bits as a Hash value for a message (information to be transmitted) of any length (less than $2^{64}$ bits). As a Hash function example by the SHA, the book describes SHA output of a message consisting of ASCII code of a, b, c 01100001 01100010 01100011 becomes

0164B8A9 14CD2A5E 74C4F7FF 082C4D97 F1EDF880 in 32-bit word units.

The SHA, which is described in detail in the book, comprises the following three steps:

(1) Dividing a message by a certain length;

(2) performing operations of exclusive OR, bit shift, etc., in combination for each message division; and (3) outputting a Hash value based on the operation results at step (2) for all message divisions.

Information can be uniquely represented by the information identifier provided by using such a Hash function. Thus, information can be identified and its distribution can be analyzed without adding an information identifier to the information.

Sixth embodiment

Next, a sixth embodiment of the information processing system of the invention will be discussed, wherein user identifiers are used in place of apparatus identifiers. In the embodiments we have discussed, the apparatus identifier is held in each information intervention apparatus and an analysis is made based on the apparatus identifier. However, normally a number of users use a workstation and who distributed information cannot be specified in tracing with the apparatus identifier. Then, in the embodiment, a configuration for carrying out an analysis based on user identifiers will be discussed. In the description that follows, a modification of the first embodiment is shown, but the configuration can also be applied to other embodiments.

Figure 33:
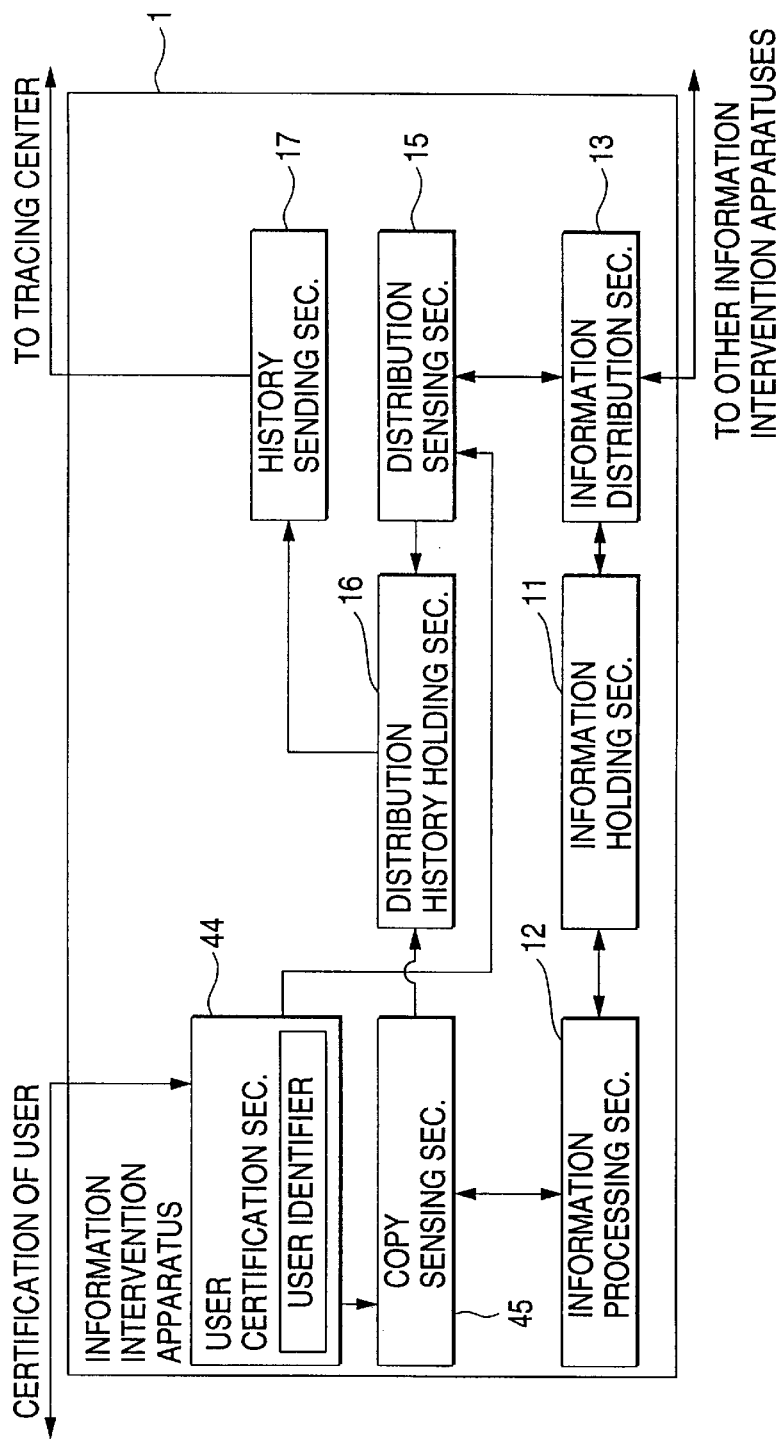
FIG. 33 is a block diagram to show an example of an information intervention apparatus in a sixth embodiment of the information processing system of the invention.

FIG. 33 is a block diagram to show an example of an information intervention apparatus in the sixth embodiment of the information processing system of the invention. Parts identical with or similar to those previously described with reference to FIGS. 1A and 1B are denoted by the same reference numerals in FIG. 33 and will not be discussed again. In FIG. 33, numeral 44 is a user certification section and numeral 45 is a copy sensing section. The configuration of a tracing center 2 is the same as that shown in FIG. 1B in the first embodiment except for the holding contents of a distribution history holding section 22 or a tracing analysis section 23, which will be discussed later.

In the sixth embodiment, the user certification section 44 is disposed in the information intervention apparatus 1 in place of the apparatus label section having the apparatus identifier in other embodiments. It certifies the user to be valid in an interactive mode if he or she is valid. When certification results in success, the user certification section 44 holds the user identifier of the user therein. The user certification method may use a conventional technique with passwords, ID cards, etc., for example. Since more than one user may use one apparatus at the same time, the user certification section 44 holds more than one user identifier. For example, when users U1 and U2 use the same information intervention apparatus 1 at the same time, the user certification section 44 holds the user identifiers of both U1 and U2.

The user identifiers need to be unique in all information intervention apparatuses that can be traced by the tracing center. Therefore, the tracing center or any other similar organization should assign the user identifiers to the users. The user identifiers may be in the same form as the information or apparatus identifier described so far.

When information is distributed between different information intervention apparatuses, the distribution sensing section 15 in the first embodiment holds the information identifier of the information, the source apparatus identifier, and the distribution time of day as a distribution history in the distribution history holding section 16. However, in the sixth embodiment, the information identifier of the information, the source user identifier, the destination user identifier, and the distribution time of day are recorded as a distribution history. If more than one user uses the apparatus at the same time, it is necessary to know which of the users distributed the information. To do this, a technique may be used wherein the person who executes operation on the apparatus can be known in the form of a process owner in a multi-user operating system typified by Unix, for example.

Although it is enough to hold distribution histories only about distribution in information intervention apparatus units in the first embodiment, it is also necessary to know information distribution between different users in one information intervention apparatus in the sixth embodiment. To do this, means for monitoring an information processing section 12 and sensing information exchange between the users is required like the creation sensing section 42 described in the second embodiment.

The copy sensing section 45 monitors the information processing section 12 for sensing information distribution typified by copying in the information intervention apparatus 1. When sensing copying or distribution in the information intervention apparatus 1, the copy sensing section 45, like the distribution sensing section 15, records the information identifier of the information, the source user identifier, the destination user identifier, and the distribution time of day in the distribution history holding section 16 as a distribution history.

Copying not bridging users, namely, copying performed by one user in his or her closed environment need not be sensed in the embodiment, but may be sensed and left in a history for simplifying the apparatus configuration. In this case, it will be processed, for example, deleted as an unnecessary distribution history later in the tracing center 2. Alternatively, it is sensed, but not written by the copy sensing section 45 into the distribution history holding section 16 if the source and destination user identifiers are the same.

The copy sensing section 45 normally is provided in the form being embedded in a low-level input/output portion of the operating system for monitoring input/output to/from the device. The source user identifier can be specified as the user starting the "copying" process and the destination user identifier can be specified as the user who owns the destination file storage location.

Figure 34:
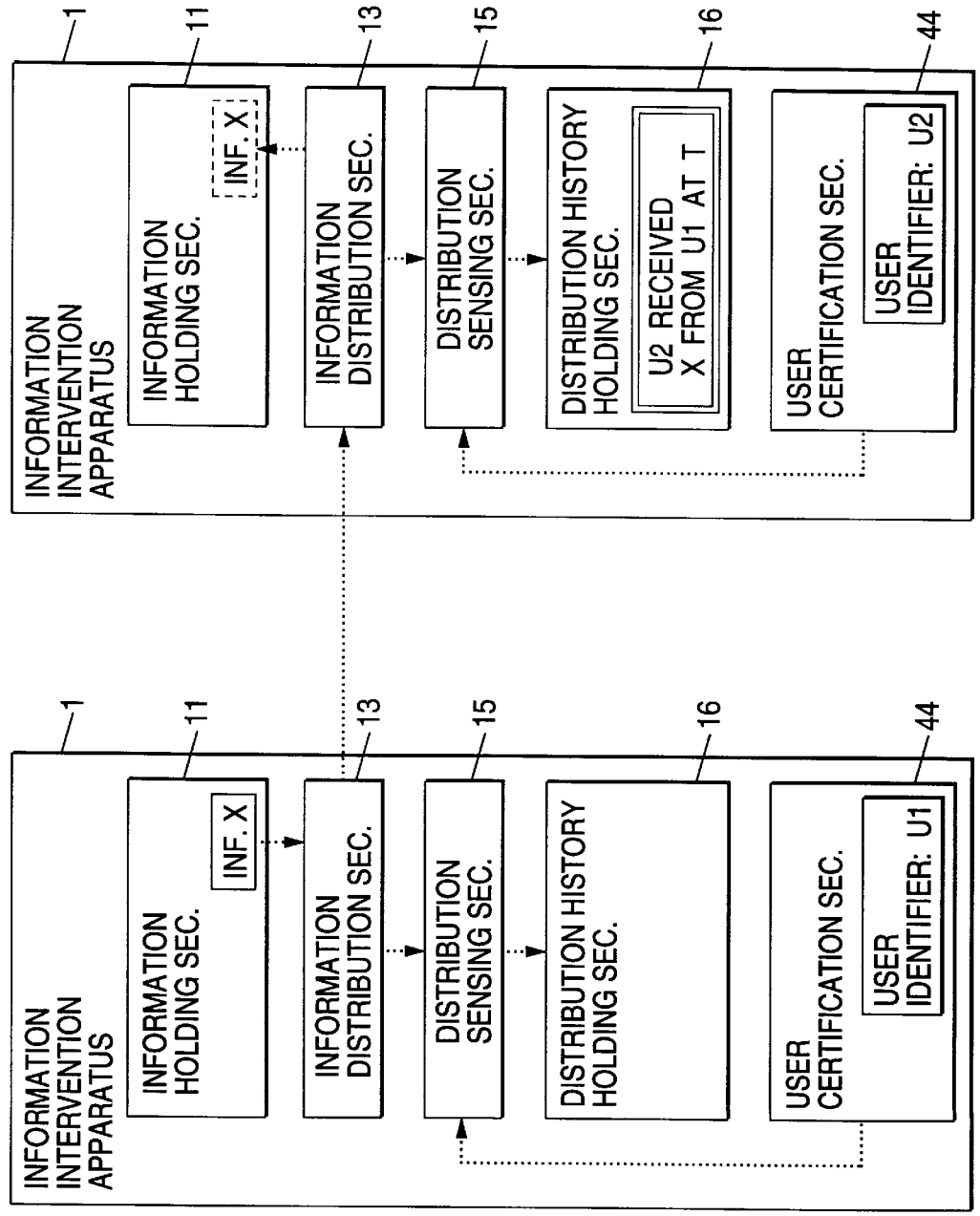
FIG. 34 is an illustration of an example of recording a distribution history for information distribution executed between the information intervention apparatuses in the sixth embodiment of the information processing system of the invention.

FIG. 34 is an illustration of an example of recording a distribution history for information distribution executed between the information intervention apparatuses in the sixth embodiment of the information processing system of the invention. In the example shown in FIG. 34, the user whose user identifier is U1 distributed information whose information identifier is X to the user whose user identifier is U2 across information intervention apparatuses. Basically, processing similar to that shown in FIG. 6 in the first embodiment is performed; when information is distributed from the source information intervention apparatus on the left of FIG. 34 to the destination information intervention apparatus on the right, the source user identifier rather than the source apparatus identifier is added to the information. In fact, the apparatus is also specified as the destination as "destined for Mr. So-and-so with a certain information intervention apparatus." Normally, network addresses and machine names are used as information intervention apparatus destinations. Of course, the apparatus identifiers may be used. In this case, the apparatus identifier may also be stored as a part of the distribution history.

When information is distributed and the distribution sensing section 15 monitoring an information distribution section 13 receives the information, the information identifier of the information, the source user identifier, the destination (reception) user identifier, and the reception time of day are recorded in the distribution history holding section 16 as a distribution history. In the embodiment, the information intervention apparatus of the information receiving party records conceptually the distribution history "U2 received X from U1 at T"

This distribution history means that user U2 received information X from user U1 at time T.

FIG. 35 is an illustration of an example of distribution histories held in the distribution history holding section of the information intervention apparatus in the sixth embodiment of the information processing system of the invention. The actual contents recorded in the distribution history holding section 16 may be character strings as mentioned above or binary data. An example of the distribution history holding section for recording binary data is shown in FIG. 35. In the example, the target information identifier corresponds to "X," the source user identifier to "U1 ," the destination user identifier to "U2 ," and the reception time to "T." One row in the table represents one distribution history. For example, the information on the top row in the table shown in FIG. 35 means that the user having user identifier "23076" received information having information identifier "67984-0176" from the user having user identifier "19311" at 12 hours 9 minutes 4 seconds 41 on Mar. 10, 1995.

Figure 36:
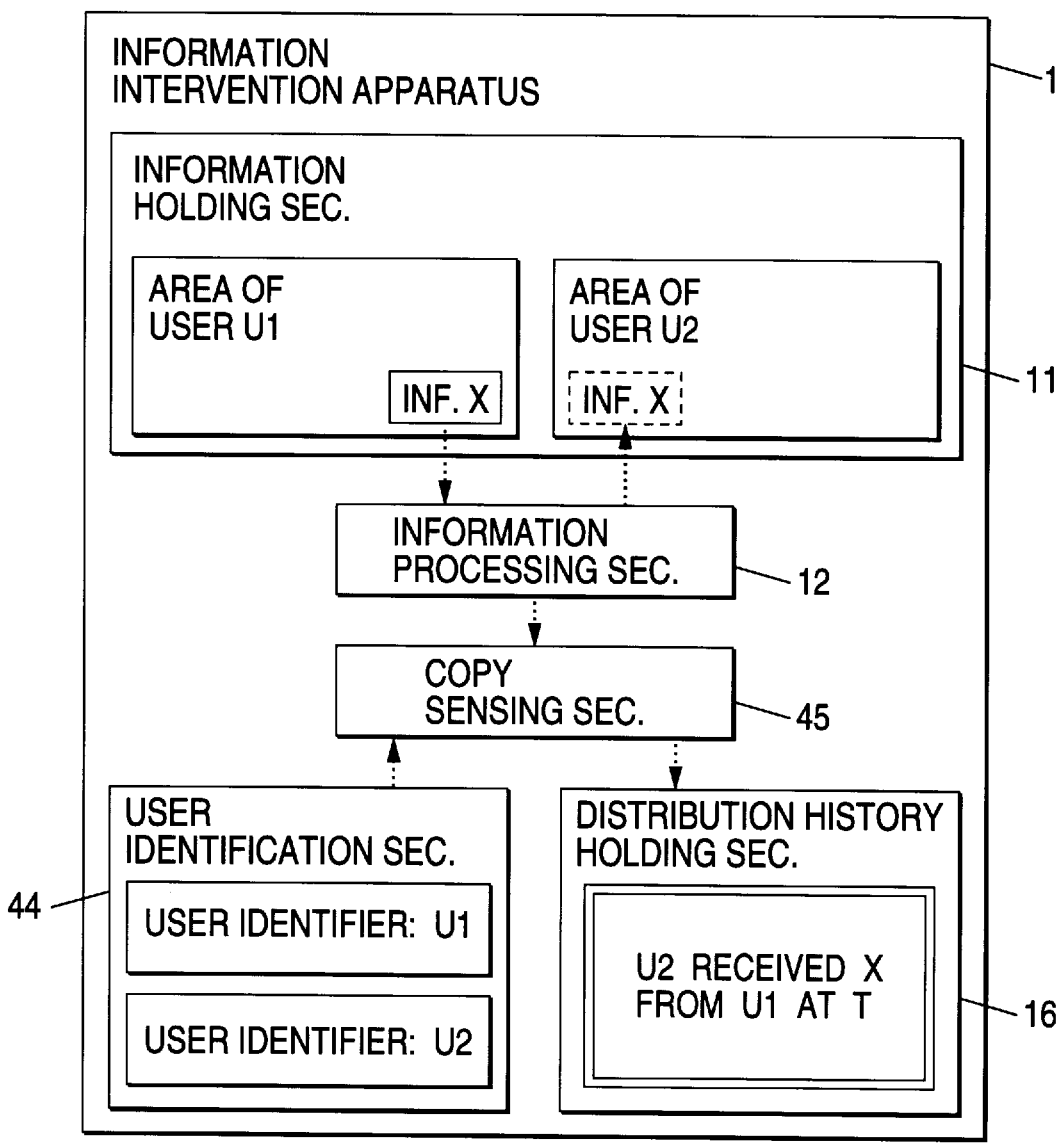
FIG. 36 is an illustration of an example of recording a distribution history for information distribution executed in the information intervention apparatus in the sixth embodiment of the information processing system of the invention.

FIG. 36 is an illustration of an example of recording a distribution history for information distribution executed in the information intervention apparatus in the sixth embodiment of the information processing system of the invention. When information is distributed in one information intervention apparatus, the information distribution section 13 may or may not be used. The information distribution section 13 is used when apparently normal distribution is executed like distribution across information intervention apparatuses, but results in distribution in one information intervention apparatus. In this case, processing is performed as distribution between the information intervention apparatuses described above and its distribution history is recorded in the distribution history holding section 16. As a specific example, a network interface is used to distribute information to its own machine via a network. In this example, the information once flows to the outside of the machine, but eventually is received at its own machine.

The information distribution section 13 is not used when information is distributed by "copying" in a secondary storage such as a hard disk drive, for example. In this case, the copy sensing section 45 for sensing "copying" without using the information distribution section 13 is required. The function of the copy sensing section 45 is to monitor the information processing section 12 for sensing information copying across users, as described above. If such operation is performed, the copy sensing section 45 stores the distribution history of the operation in the distribution history holding section 16.

The example shown in FIG. 36 indicates that information X was copied from user U1 to user U2 at time T in one apparatus. User U1 copies information X stored in an information holding section 11 indicated as an area of user U1 to the information holding section 11 indicated as an area of user U2 through the information processing section 12. The "area of user U1" means a directory owner in the Unix operating system etc., and an owner of a partial area of the information holding section 16.

The copying executed at this time is assumed to be information distribution, namely, copying to the information holding area owned by a different user is assumed to be information distribution, and the copy sensing section 45 sensing the information holding section 11 senses it and records a history in the distribution history holding section 16. In this example, the user executing the copying is the source user and the owner of the copy destination information holding area is the destination user. Resultantly, the distribution history "U2 received X from U1 at T"

is written into the distribution history holding section 16. It has the same meaning as the distribution history of the distribution across the information intervention apparatuses.

The tracing center 2 collects the distribution histories held in the information intervention apparatuses 1 as in the first embodiment. At this time, the distribution history contents differ, thus partial processing changes accordingly.

The distribution history holding section 22 holds the histories collected from the information intervention apparatuses 1. FIGS. 37A and 37B are illustrations of examples of distribution histories collected by the tracing center and held in the distribution history holding section in the sixth embodiment of the information processing system of the invention. FIG. 37A shows conceptual representation of an example of collected distribution histories. FIG. 37B shows an example of binary representation thereof. FIGS. 37A and 37B are the same in meaning. In the representation in FIG. 37A, "Apparatus" is parenthesized, which means that in fact, the histories were collected from the information intervention apparatuses A and B, but the distribution history holding section 22 in the tracing center 2 does not manage information on the information intervention apparatuses. Therefore, in the distribution history holding section 22 in the tracing center 2, the four entries of a target information identifier, source user identifier, destination user identifier, and reception time represent one distribution history, which is the same as each distribution history held in the information intervention apparatuses. Of course, apparatus identifiers may also be held.

Each distribution history held in the distribution history holding section 22 shown in FIG. 37B is already represented in the format that "information X was distributed from source user U to destination user U2 at time T." Thus, the tracing analysis section 23 need not convert the distribution history representation format. This means that steps S103–S105 need only to be omitted in the algorithm of the tracing analysis section 23 shown in FIG. 11 in the first embodiment. That is, the user, etc., is prompted to specify the identifier of information to be traced at step S101 and only the distribution histories related to the information to be traced are extracted at step S102 and are resorted in the time order at step S106.

FIGS. 38A and 38B are illustrations of examples of the analysis result of a tracing analysis section in the sixth embodiment of the information processing system of the invention. For example, consider that when distribution histories as shown in FIGS. 37A and 37B are collected and held in the distribution history holding section 22, the user or the like gives an instruction for analyzing the information whose information identifier is "679840-176" (information X). In this case, the distribution histories with information identifier "679840-176," namely, the distribution histories on the first, third, and fourth rows are extracted from the distribution histories shown in FIGS. 37A and 37B and are resorted in the time order, whereby the analysis result as shown in FIG. 38B is provided. FIG. 38A shows the analysis result in conceptual representation.

Figure 39:
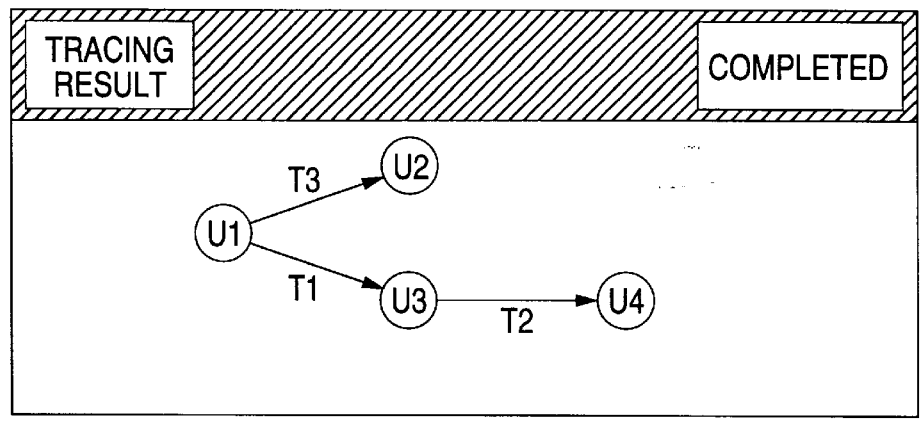
FIG. 39 is an illustration of an example of display produced by an analysis result display section in the sixth embodiment of the information processing system of the invention.
Figure 40:
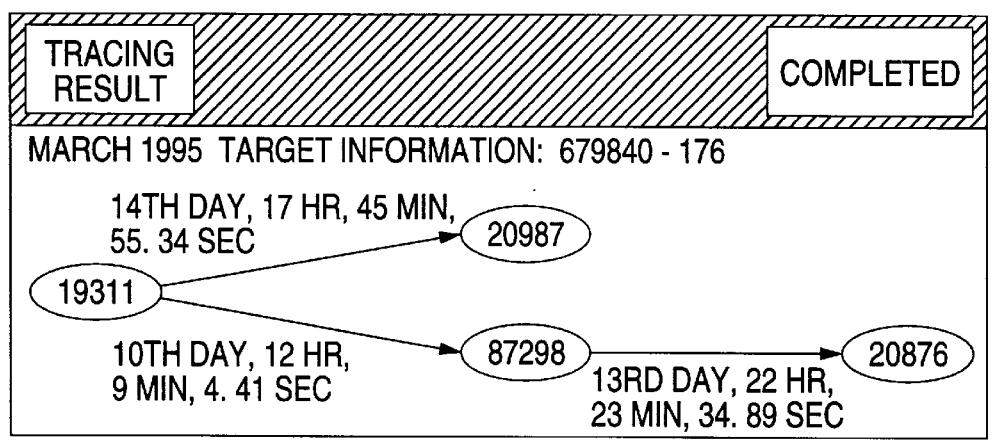
FIG. 40 is an illustration of another example of display produced by the analysis result display section in the sixth embodiment of the information processing system of the invention.

FIGS. 39 and 40 are illustrations of examples of display produced by an analysis result display section in the sixth embodiment of the information processing system of the invention. The analysis result provided by the tracing analysis section 23 is illustrated by the analysis result display section 24. For example, if the analysis result as shown in FIGS. 38A and 38B is provided, it can be displayed as shown in FIG. 39, wherein circle nodes correspond to the users having the circled user identifiers and arcs denote distribution directions. The distribution time of day is placed on the side of each arc. They are displayed on a display, for example.

FIG. 39 represents the user identifiers and the times by symbols. However, in addition, the times can be represented by digits, for example. Further, the user identifiers can also be represented by digits. FIG. 40 shows a display example of representing the user identifiers and the times by digits.

In the embodiments we have discussed, the three information entries of time of day, source apparatus identifier, and information identifier (in the sixth embodiment, the four information entries of time of day, source user identifier, destination user identifier, and information identifier) are used as a distribution history, but the distribution history information is not limited to them. For example, if the time information is not required, the time of day need not be recorded. To know only the distribution range, the source apparatus or user identifier need not be recorded either. Alternatively, the history may contain all environment information when information is used or manipulated, such as the organization to which the machine or user belongs, the machine use location, and the application program used at the same time as the information is used.

In the embodiments we have discussed, except item (3) in the fourth embodiment, the destination information intervention apparatus records the apparatus or user identifier of the source information intervention apparatus, but the source information intervention apparatus can record the destination apparatus or user identifier. Of course, both information intervention apparatuses may record identifiers mutually. Further, the distribution histories may be recorded on media or in information label sections rather than in the information intervention apparatuses.

In the above embodiments, the analysis result is only displayed; how the result is used is arbitrary. The analysis result can be used in various manners; for example, such a component using the tracing result to automatically send additional information to persons who received one information can be added.

Seventh embodiment

Next, a seventh embodiment of the invention will be discussed. In the seventh embodiment, information and information intervention apparatuses are handled as one group according to the feature and attribute thereof, whereby the feature is made outstanding when the distribution state is displayed. According to the seventh embodiment, for example, how software classified into word processors is distributed, how intra company communication documents are distributed, what the correlation between user layers and kinds of information is, etc., can be examined.

The basic configuration of the seventh embodiment is the same as the configuration of the first embodiment except for a tracing analysis section 23 or an analysis result display section 24 in a tracing center. A description will be given centering on the differences between the first and seventh embodiments.

In the first embodiment, as shown in FIG. 1B, the tracing analysis section 23 carries out an analysis upon reception of an instruction from the user. At this time, the user instruction contains the "information identifier of the information to be traced," for example, as shown at step S101 in FIG. 11. In the seventh embodiment, it changes to the "attributes of the information and apparatus to be traced." The information attributes are information types, such as music genres, report types, and software types like word processors. The apparatus attributes can also include user ages and genders of the apparatus, for example, in addition to the model, etc.

Figure 41:
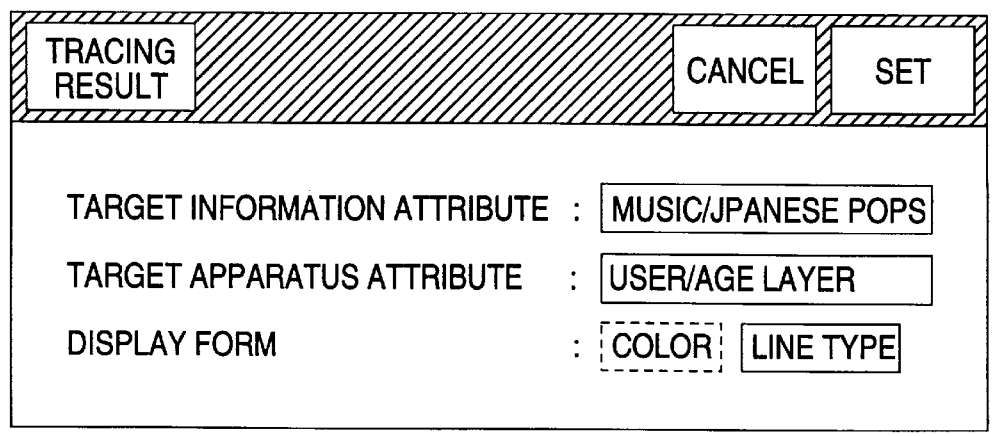
FIG. 41 is an illustration of an example of user specification for a tracing analysis section in a seventh embodiment of the information processing system of the invention.

FIG. 41 is an illustration of an example of user specification for the tracing analysis section in the seventh embodiment of the information processing system of the invention. In the example, "music/Japanese pops" is selected as the information attribute and "user/age layer" is selected as the apparatus attribute. In the example, only one attribute is specified as the attribute information, but more than one attribute may be able to be specified at a time, for example, like "user/age layer and gender." The operation when more than one attribute is specified will be discussed later. In the display format field, the user specifies how the tracing analysis result is to be displayed. In the example, either of the options, color or line type can be specified; here, the line type is specified. The display format is used to display arcs; the arcs are changed and displayed according to the specified display format so as to allow recognition of the information distribution amounts.

In the example, the user specifies the attribute values directly, but options may be displayed in a menu form for the user to specify an option out of the menu.

FIG. 42 is an illustration of an example of distribution route display produced by an analysis result display section in the seventh embodiment of the information processing system of the invention. For example, the user specifies the tracing process contents as shown in FIG. 41, and accordingly the analysis result display section 24 outputs the result as shown in FIG. 42.

In FIG. 42, nodes represent user age layers, each arc between the nodes represents information between age layers (in this case, the distribution amount of music information of Japanese pops), and the arc thickness is proportional to the information distribution amount. This means that the display example shown in FIG. 42 indicates how the music information of "Japanese pops" is distributed among the age layers. The display reveals that the genre "Japanese pops" is distributed centering on teens and that particularly distribution from teens to twenties is much as distribution between age layers, namely, persons in their teens pass information to persons in their twenties. A distribution strategy can be made by carrying out such a result analysis. For example, the reason why a reasonable amount of information is distributed from persons in their teens to persons in their forties is considered and for example, it is guessed that the information is distributed from children to parents in their families, whereby a distribution strategy of advertising for families can be made.

Next, the processing procedure of the tracing analysis section 23 for performing such processing will be briefly discussed. First, the distribution histories related to the information fitting the information attribute specified by the user are gathered. They should be histories for each information intervention apparatus as shown in FIG. 9. Although FIG. 9 shows only the histories of information having a specific information identifier, the distribution histories of information fitting one information attribute are gathered in the seventh embodiment.

To gather the distribution histories, the information identifier of the information having the information attribute specified by the user is obtained and the distribution histories having the obtained information identifier can be gathered. FIG. 43 is an illustration of an example of an information attribute database in the seventh embodiment of the information processing system of the invention. The correspondence between the information identifiers and the information attributes is registered in the information attribute database shown in FIG. 43. In the example shown in the figure, the three attribute values of major classification, middle classification, and minor classification are shown as information attributes corresponding to information identifiers. Such an information attribute database can be registered by the user who declares information classification for the tracing center when attempting to distribute information. The information attribute database as shown in FIG. 43 is searched based on the information attribute specified by the user, whereby a set of the information identifiers having the specified information attribute can be obtained. Distribution histories are gathered based on the obtained information identifier set, whereby a set of the distribution histories related to the information having the specified information attribute can be obtained.

Alternatively, the information attribute is described in the information label section of the information and the information label sections of the information existing in the distribution histories gathered by the tracing center 2 are referenced, whereby whether or not the information fits the information attribute specified by the user may be determined. In any way, information and its information attribute may be related to each other by some method.

Next, by assuming that collection source apparatus identifiers to be "destination apparatus identifiers," while the apparatus attribute is being referenced, the gathered distribution histories are converted into distribution histories between the apparatus identifiers. FIG. 44 is an illustration of an example of a apparatus attribute database in the seventh embodiment of the information processing system of the invention. The correspondence between the apparatus identifiers and user attributes is previously held as an apparatus attribute database. In the example shown in FIG. 44, the name, age, job type, and gender of each user, the model name of each apparatus, etc., are registered as the apparatus attributes corresponding to each apparatus identifier. While referencing the apparatus attribute database previously held in the format as shown in FIG. 44, the tracing center 2 lists the distribution histories of the apparatuses having the same apparatus attribute.

Figures 45, 46:
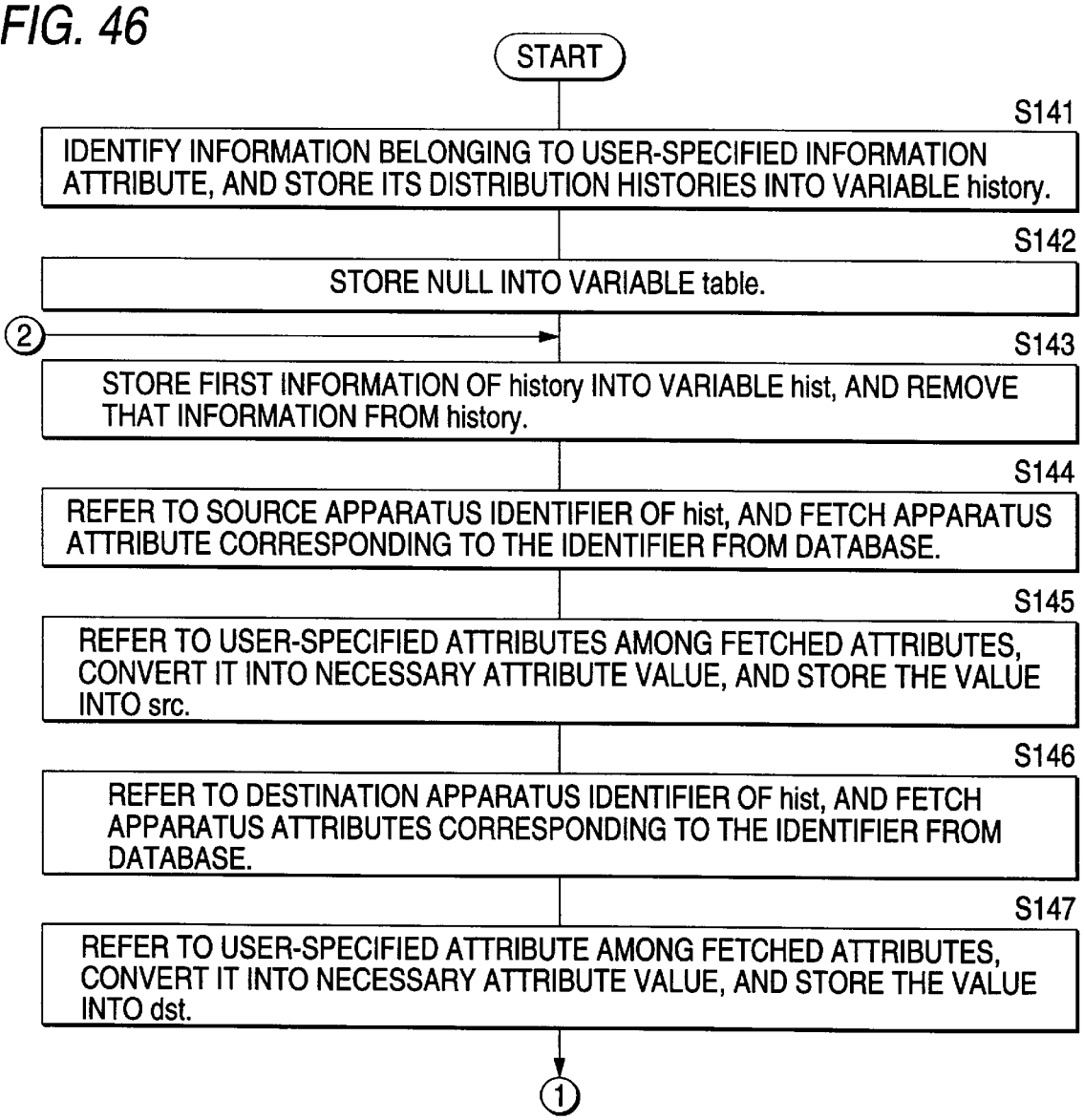
FIG. 45 is an illustration of an example of the analysis result of the tracing analysis section in the seventh embodiment of the information processing system of the invention.
FIG. 46 is a flowchart to show an example of the operation of the tracing analysis section in the seventh embodiment of the information processing system of the invention.

FIG. 45 is an illustration of an example of the analysis result of the tracing analysis section in the seventh embodiment of the information processing system of the invention. The result, for example, as shown in FIG. 45 is provided by listing the distribution histories having the same apparatus attribute as described above. In FIG. 45, the number of the distribution histories between the apparatuses having the same apparatus attribute is counted as the distribution amount. The result is adopted as the analysis result of the tracing analysis section 23.

Figure 47:
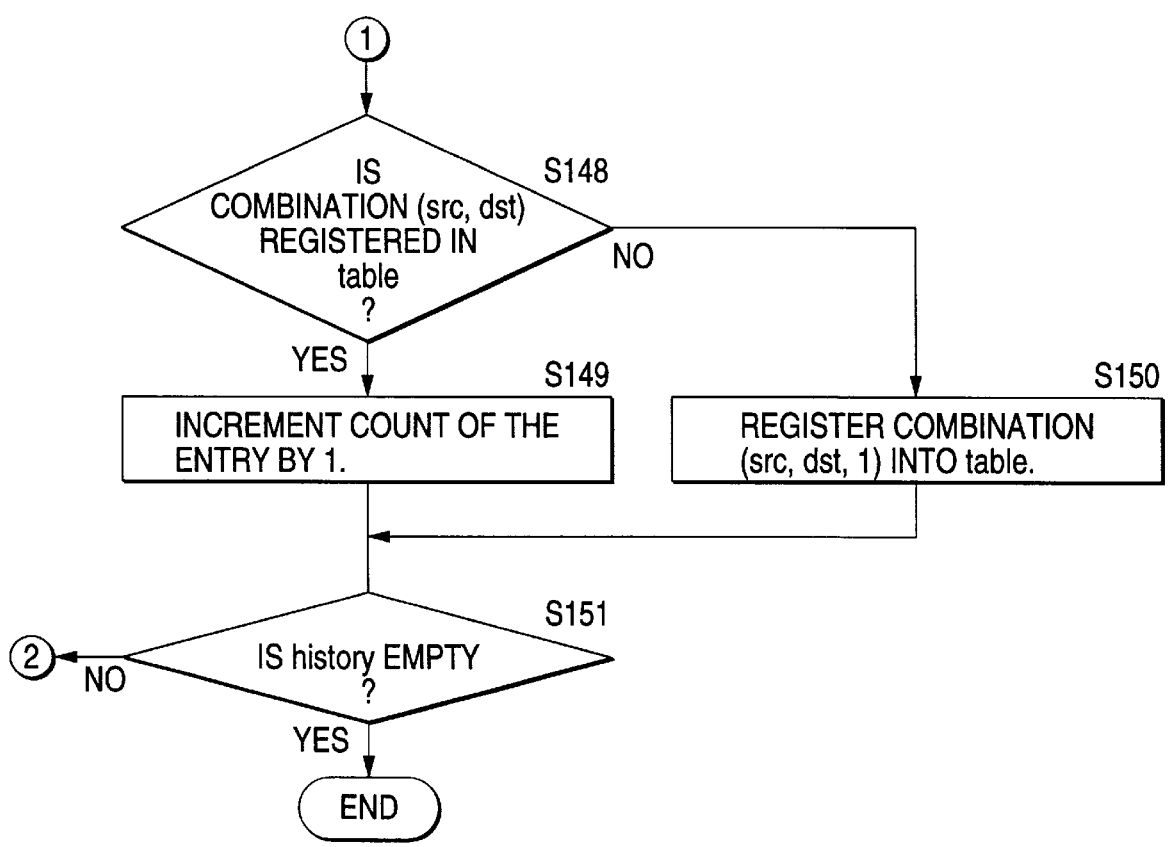
FIG. 47 is a flowchart to show an example of the operation of the tracing analysis section in the seventh embodiment of the information processing system of the invention (continued)

FIGS. 46 and 47 are flowcharts to show an example of the operation of the tracing analysis section 23 in the seventh embodiment of the information processing system of the invention. The operation of the tracing analysis section 23 will be discussed with reference to FIGS. 46 and 47. At step S141, information (information identifier) belonging to the information attribute specified by the user is determined and its distribution histories are stored in variable history. The information identifier can be found, for example, by searching the information attribute database as shown in FIG. 43 with the specified information attribute as a key, as described above.

At step S142, NULL is stored in variable table for initialization. The variable table holds a pair of a source apparatus attribute value and a destination apparatus attribute value and a count corresponding to the pair.

At step S143, the first information item in the variable history is stored in variable hist and is removed from the variable history. At step S144, the source apparatus identifier in the variable hist is referenced and the apparatus attributes corresponding to the apparatus identifier are fetched from the apparatus attribute database, for example, as shown in FIG. 44. At step S145, the user-specified attribute is referenced among the fetched apparatus attributes and is converted into a necessary attribute value, which is then stored in variable src. Further, at step S146, the destination apparatus identifier in the variable hist is referenced and the apparatus attributes corresponding to the apparatus identifier are fetched from the apparatus attribute database, for example, as shown in FIG. 44. At step S147, the user-specified attribute is referenced among the fetched apparatus attributes and is converted into a necessary attribute value, which is then stored in variable dst.

At step S148, whether or not the pair of the variables src and dst is registered in the variable table is determined. If it is registered, the count of the entry is incremented by one at step S149; if not, the combination of the variables src and dst and the count value 1 is registered in the variable table as a new entry at step S150.

At step S151, whether nor not the variable history is empty is determined for checking to see if all distribution histories found at step S141 have been processed. If an unprocessed distribution history exists, control returns to step S143 and processing is performed for the distribution history. Upon completion of processing for all distribution histories, the processing of the tracing analysis section 23 is terminated. The contents stored in the variable table at the processing termination time are the analysis result.

Figure 48:
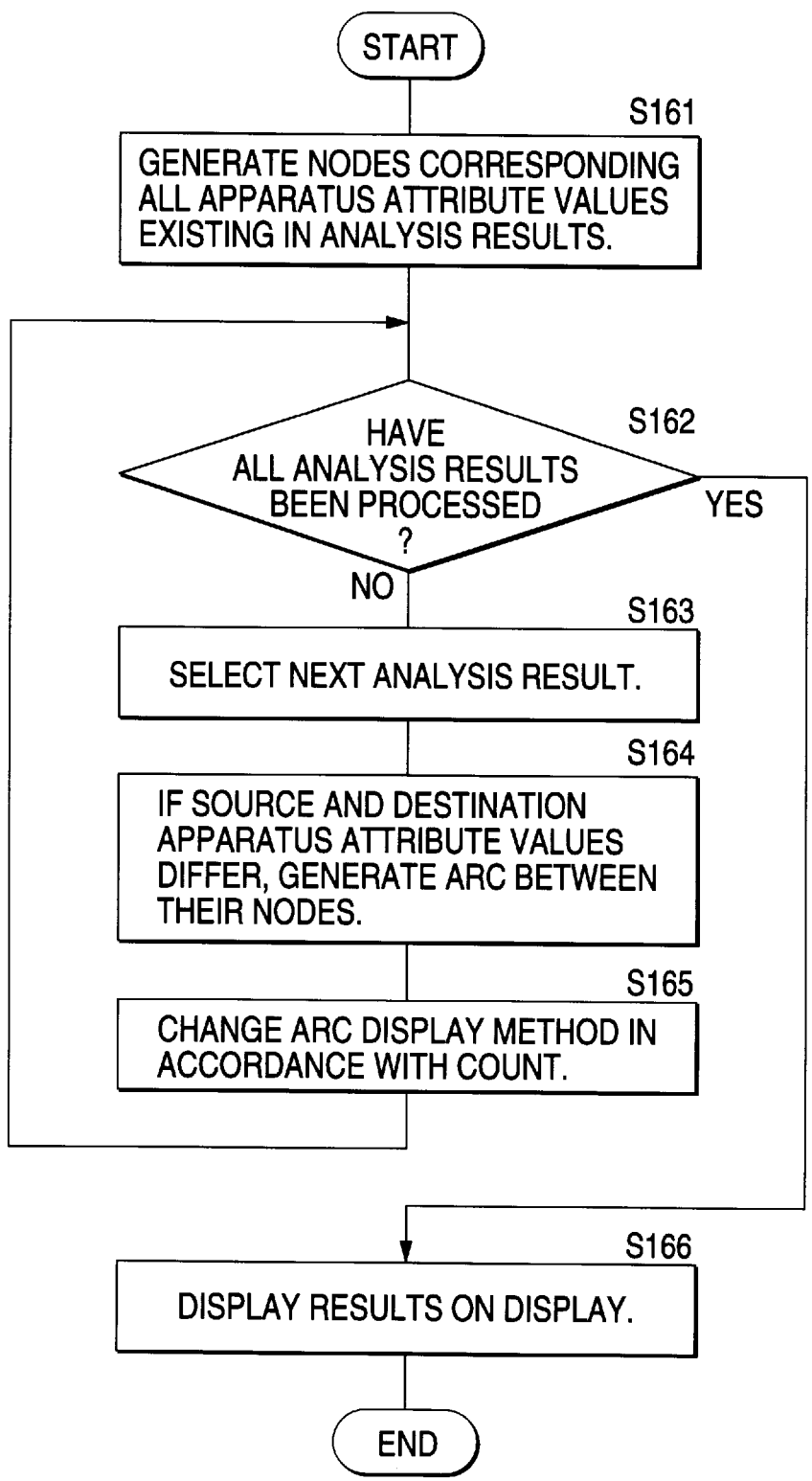
FIG. 48 is a flowchart to show an example of the operation of the analysis result display section in the seventh embodiment of the information processing system of the invention.

FIG. 48 is a flowchart to show an example of the operation of the analysis result display section in the seventh embodiment of the information processing system of the invention. The operation of the analysis result display section 24 is almost the same as that in the first embodiment shown in FIG. 13; processing for apparatus identifiers may be changed to processing for apparatus attribute values. First, at step S161, nodes corresponding to all apparatus attribute values existing in the analysis result are prepared. At step S162, whether all entries of the analysis result have been processed is determined. Steps S163–S165 are executed for unprocessed analysis result entries. At step S163, another analysis result entry is selected. Only when the source and destination apparatus attribute values differ for the analysis result, an arc is prepared between the nodes at step S164, and the display method of the prepared arc is changed according to the count at step S165. At this time, for example, the display format specified by the user on the input screen in FIG. 41 is used. Upon completion of the arc preparation for all the analysis result, the result is displayed, on a display, such as a CRT, at step S166.

Since distribution between the apparatuses having the same attribute is not displayed at step S164, such processing at the step is performed; of course, the distribution may be displayed and the user may be able to make its specification. When the display method is changed at step S165, for example, if the display format is selected so as to change the line type as shown in FIG. 41, heavy lines are used when the counts, namely, the information distribution amounts are large; thin and broken or dotted lines are used when the numeric values are small. If the display format is selected so as to change color, the numeric values, large and small, are shown by changing the color in such a manner that larger values are displayed in red and that smaller values are displayed in blue. In the example shown in FIG. 41, only the color and line type are optional, but other display formats can also be adopted, of course. Various display formats can also be taken, for example, by changing the brightness, blinking the maximum distribution amount arc, etc. The distribution amount in the same apparatus attribute can also be shown, for example, by changing the frame indicating the node corresponding to the apparatus attribute according to the specified display format.

Such distribution amount display enables the user to check the distribution form to see if documents which should be distributed according to the organization hierarchy from department chiefs to section chiefs to group chiefs to employees in one enterprise are actually distributed horizontally among employees or section chief s or how much the documents are distributed in such a manner or check the distribution condition to see if document distribution is delayed in the organization in such a manner that the documents are distributed to the section chiefs, but not much distributed to the subordinates in one department. If it is decided that the check result involves a problem, measures against the problem can be taken.

Eighth embodiment

Next, an eighth embodiment of the invention will be discussed. The eighth embodiment also holds use histories and relates both use and distribution histories to each other for analyzing trace information rather than analyzing tracing based only on distribution histories as we have discussed, whereby the relationship between distribution and use, namely, whether utilization of information is made high or low when how the information is distributed can be understood.

Figure 49:
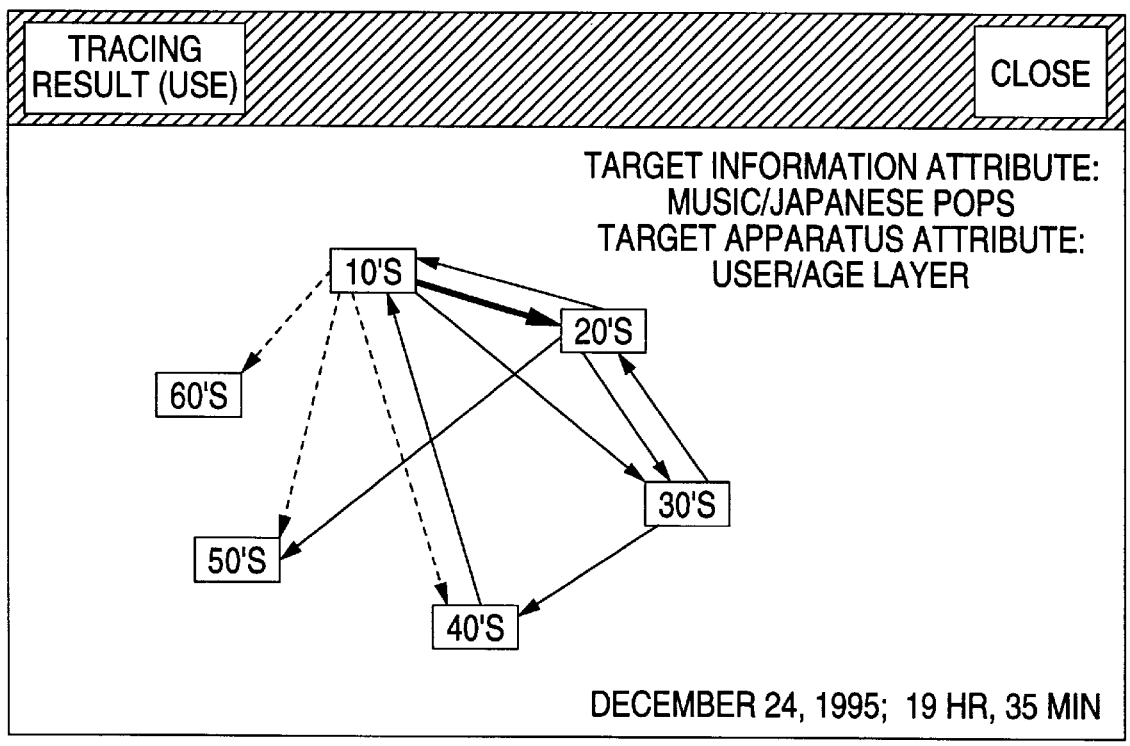
FIG. 49 is an illustration of an example of distribution route display produced by an analysis result display section in an eighth embodiment of the information processing system of the invention.

FIG. 49 is an illustration of an example of distribution route display produced by an analysis result display section in the eighth embodiment of the information processing system of the invention. The display example shown in FIG. 49 is displayed in a similar format to that in FIG. 42; when they are compared, the heavy arcs in FIG. 42 are drawn thin and solid line arcs are changed to dotted line arcs. This is the display result related to the use histories. Distribution of information differs from use of the information. For example, one person receives information, but may pass it to another person without using the information. Arcs changed to thin lines and dotted lines in FIG. 49 mean that the information was distributed, but not used at the destinations. For example, FIG. 42 indicates that the information is distributed comparatively much from teens to forties and fifties; the arcs are changed to thin lines or dotted lines in FIG. 49, indicating that persons in their fifties and forties receiving the information do not much use it. Thus, the eighth embodiment enables the user to grasp the information utilization together with the information distribution amounts.

Figure 50:
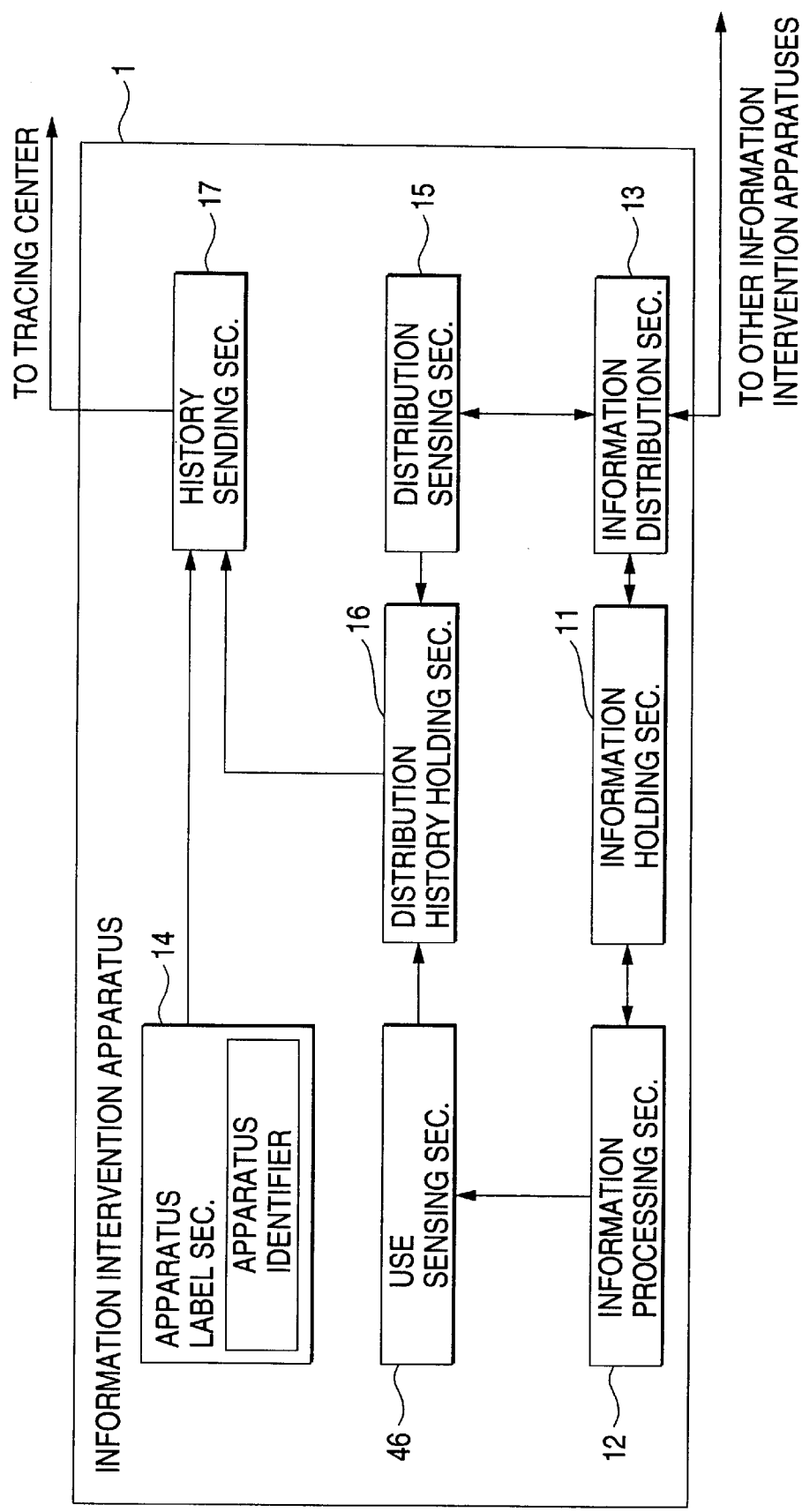
FIG. 50 is a block diagram to show an example of an information intervention apparatus in the eighth embodiment of the information processing system of the invention.

FIG. 50 is a block diagram to show an example of an information intervention apparatus in the eighth embodiment of the information processing system of the invention. Parts identical with or similar to those previously described with reference to FIGS. 1A and 1B are denoted by the same reference numerals in FIG. 50 and will not be discussed again. In FIG. 50, numeral 46 is a use sensing section. In the eighth embodiment, the information intervention apparatus has the use sensing section 46 in place of the creation sensing section 42 in the second embodiment.

The use sensing section 46 senses that information is used in an information processing section 12, and prepares a use history related to the information use. It can be provided by using a related art, for example, a technique such as a software management scheme in Japanese Examined Patent Publication No. Hei. 6-95302.

A distribution history holding section 16 holds the use histories prepared by the use sensing section 46 as well as distribution histories. Therefore, it holds different types of histories, which can be distinguished from each other by providing the history type as shown in FIG. 16 in the second embodiment. However, since the history types differ, the type of held information changes.

Figures 51, 52:
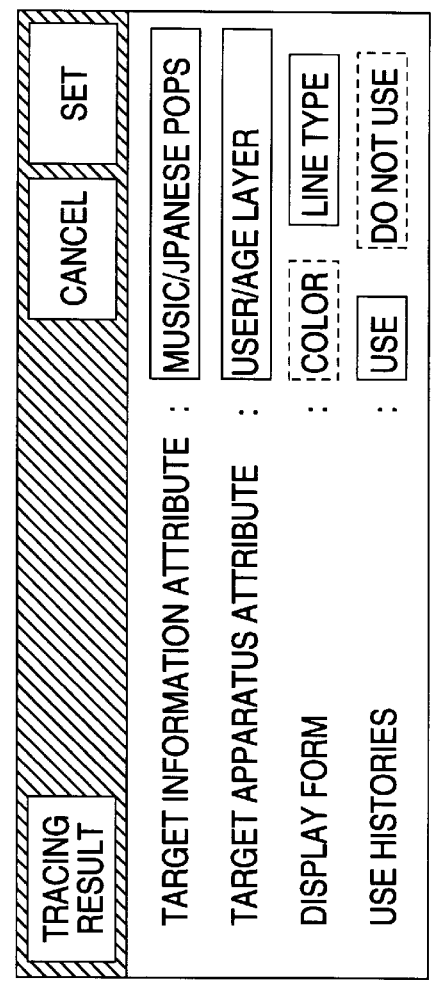
FIG. 51 is an illustration of an example of distribution histories held in a distribution history holding section of the information intervention apparatus in the eighth embodiment of the information processing system of the invention.
FIG. 52 is an illustration of an example of user specification for a tracing analysis section in the eighth embodiment of the information processing system of the invention.

FIG. 51 is an illustration of an example of distribution histories held in the distribution history holding section of the information intervention apparatus in the eighth embodiment of the information processing system of the invention. In the example, if the history type is 0, it means a distribution history; if the history type is 1, it means a use history. For the distribution history, the source apparatus identifier is set together with the target information identifier and the reception time of day. For the use history, if the use amount is involved, for example, a value indicating how much time the information was used is set together with the target information identifier and the use time of day. For the use history of only simple use of the information, as in the use history on the fourth row, the use amount is not set.

Next, the operation of the tracing analysis section 23 in the eighth embodiment will be discussed. Since the basic operation of the tracing analysis section 23 very resembles that in the seventh embodiment, a description will be given centering on changes from the seventh embodiment.

FIG. 52 is an illustration of an example of user specification for the tracing analysis section in the eighth embodiment of the information processing system of the invention. In addition to the tracing specification contents shown in FIG. 41, the user can specify whether or not use histories are used. In FIG. 52, to make the specification, an item for specifying whether or not use histories are used is added. In the example shown in FIG. 52, use of use histories is specified.

Figure 53:
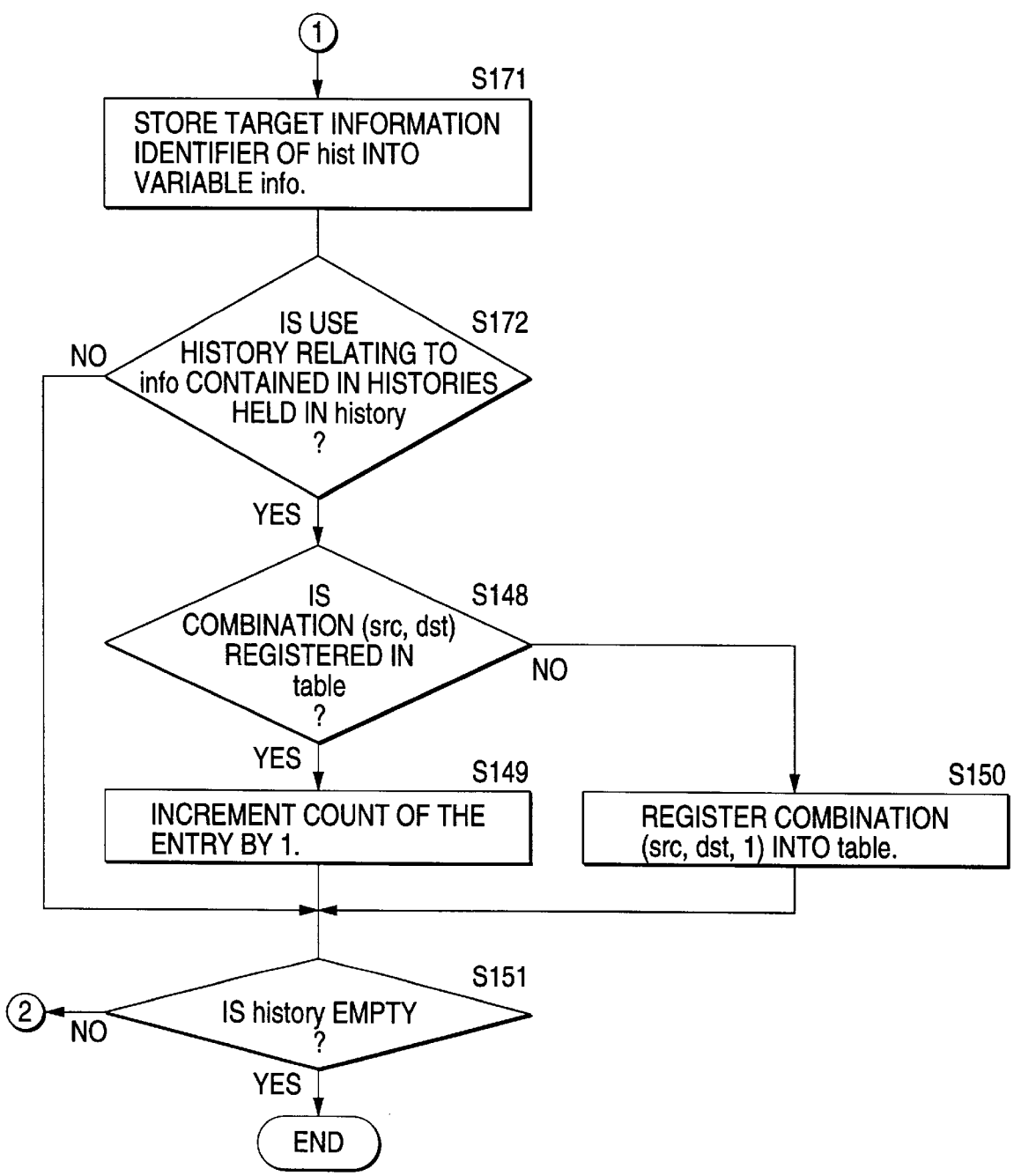
FIG. 53 is a flowchart (part) to show an example of the operation of the tracing analysis section in the eighth embodiment of the information processing system of the invention.

FIG. 53 is a flowchart to show an example of the operation of the tracing analysis section in the eighth embodiment of the information processing system of the invention. It is a continuation of FIG. 46 showing an example of the operation of the tracing analysis section in the seventh embodiment, and replaces FIG. 47. Steps similar to those in FIG. 47 are denoted by the same numbers in FIG. 53.

At steps S141–S147 in FIG. 46, one of histories is stored in the variable hist and the source and destination apparatus attribute values are stored in the variables src and dst. At step S171, the target information identifier in the variable hist is stored in variable info.

At step S172, whether or not a use history related to the variable info is contained in the histories held in the variable history is determined. If a use history exists, namely, only when the target information is used at the destination apparatus, the count is incremented or the combination is registered at steps S148–S150; otherwise, the entry is not counted.

By performing such processing, when information is distributed, but not used, it can be excluded from the count. An analysis result display section 24 processes the analysis result as in the seventh embodiment, whereby the analysis result, for example, as shown in FIG. 49, can be output.

If the result considering the use histories is only displayed as shown in FIG. 49, the fact that the original distribution amount of information is small cannot be distinguished from the fact that the utilization of the information is low. Thus, for example, the result display as shown in FIG. 49 can be easily switched to the result display before the utilization histories are applied, as shown in FIG. 43. If the distribution amounts are displayed in different line types, the colors of arcs changed by applying the use histories can be changed for display or if the distribution amounts are displayed in different colors, the line types of arcs changed by applying the use histories can be changed for display. To change the colors, display can be produced in such a manner that changed arcs are represented in red or that the larger the change amount, the greater the color change. The change amount according to the utilization of information can also be displayed in an easy-to-understand manner by such display method change. This can be easily provided by combining the processing results in the seventh and eighth embodiments.

Although totalization is applied to the information intervention apparatuses in the seventh and eighth embodiments, totalization centering on the users can also be carried out by adopting a configuration similar to that of the sixth embodiment.

As seen from the description made so far, according to the invention, when information is distributed, a distribution history is recorded, whereby distribution information of the information distribution route, distribution range, distribution amount, etc., can be traced later. Tracing in a wider range is enabled by recording not only distribution histories, but also information preparation and use histories. The invention can be applied to distribution of all digitalized information such as texts, images, voice, and programs. It can be used to locate the information distribution route and distribution range and the distributor and distribution route of illegal information. Further, analysis can be carried out on distribution of various pieces of information as the distribution route relationship between the information and apparatus attributes can be examined. Use histories can also be gathered for examining the distribution route relationship; how information is distributed for frequent use of the information can be examined.

What is claimed is:

1. An information tracing system comprising:

a plurality of distribution sensing means each for sensing information distribution from a first information processing apparatus as an information distribution source to a second information processing apparatus as an information distribution destination;

a plurality of distribution history storing means each for storing a history relating to the information distribution sensed by an associated one of said plurality of distribution sensing means;

a plurality of transmitting means each for transmitting the history stored in an associated one of said plurality of distribution history storing means;

a single receiving means for receiving the histories transmitted from said plurality of transmitting means; and analyzing means for analyzing a distribution route based on the histories received by said single receiving means, wherein said plurality of distribution sensing means senses the information distribution by sensing sending of information when it is sent from the first information processing apparatus.

2. An information tracing system comprising:

a plurality of distribution sensing means each for sensing information distribution from a first information processing apparatus as an information distribution source to a second information processing apparatus as an information distribution destination;

a plurality of distribution history storing means each for storing a history relating to the information distribution sensed by an associated one of said plurality of distribution sensing means;

a plurality of transmitting means each for transmitting the history stored in an associated one of said plurality of distribution history storing means;

a single receiving means for receiving the histories transmitted from said plurality of transmitting means; and analyzing means for analyzing a distribution route based on the histories received by said single receiving means, wherein said plurality of distribution sensing means senses the information distribution by sensing sending of information when it is sent from the first information processing apparatus, and by sensing reception of the information when it is received by the second information processing apparatus.

3. An information tracing system comprising:

a plurality of distribution sensing means each for sensing information distribution from a first information processing apparatus as an information distribution source to a second information processing apparatus as an information distribution destination;

a plurality of distribution history storing means each for storing a history relating to the information distribution sensed by an associated one of said plurality of distribution sensing means;

a plurality of transmitting means each for transmitting the history stored in an associated one of said plurality of distribution history storing means;

a single receiving means for receiving the histories transmitted from said plurality of transmitting means;

analyzing means for analyzing a distribution route based on the histories received by said single receiving means;

editing means for editing information;

edit sensing means for sensing an edit performed by said editing means; and edit history storing means for storing a history relating to the edit sensed by said edit sensing means, wherein said transmitting means transmits the history stored in said plurality of distribution history storing means and the history stored in said edit history storing means, and wherein said analyzing means analyzes the distribution route and an alteration of information based on the histories received by said single receiving means.

4. An information tracing system comprising:

a plurality of distribution sensing means each for sensing information distribution from a first information processing apparatus as an information distribution source to a second information processing apparatus as an information distribution destination;

a plurality of distribution history storing means each for storing a history relating to the information distribution sensed by an associated one of said plurality of distribution sensing means;

a plurality of transmitting means each for transmitting the history stored in an associated one of said plurality of distribution history storing means;

a single receiving means for receiving the histories transmitted from said plurality of transmitting means;

analyzing means for analyzing a distribution route based on the histories received by said single receiving means; and an information label generating means for generating an information label based on distributed information, and wherein said distribution history storing means stores the information label generated by said information label generating means as the history relating to the information distribution.

5. An information tracing system comprising:

a plurality of distribution sensing means each for sensing information distribution from a first information processing apparatus as an information distribution source to a second information processing apparatus as an information distribution destination;

a plurality of distribution history storing means each for storing a history relating to the information distribution sensed by an associated one of said plurality of distribution sensing means;

a plurality of transmitting means each for transmitting the history stored in an associated one of said plurality of distribution history storing means;

a single receiving means for receiving the histories transmitted from said plurality of transmitting means; and analyzing means for analyzing a distribution route based on the histories received by said single receiving means, wherein said distribution sensing means senses the information distribution when information stored on an information recording medium is distributed, and wherein said plurality of distribution history storing means stores, onto the information recording medium, the history relating to the information distribution and a medium label for the information recording medium together with the information.

6. An information tracing system comprising:

a plurality of distribution sensing means each for sensing information distribution from a first information processing apparatus as an information distribution source to a second information processing apparatus as an information distribution destination;

a plurality of distribution history storing means each for storing a history relating to the information distribution sensed by an associated one of said plurality of distribution sensing means;

a plurality of transmitting means each for transmitting the history stored in an associated one of said plurality of distribution history storing means;

a single receiving means for receiving the histories transmitted from said plurality of transmitting means;

analyzing means for analyzing a distribution route based on the histories received by said single receiving means; and an history requesting means for requesting said plurality of transmitting means to transmit histories of information, wherein said plurality of transmitting means transmits the histories when so requested by said history requesting means.

7. An information tracing system comprising:

a plurality of distribution sensing means each for sensing information distribution from a first information processing apparatus as an information distribution source to a second information processing apparatus as an information distribution destination;

a plurality of distribution history storing means each for storing a history relating to the information distribution sensed by an associated one of said plurality of distribution sensing means;

a plurality of transmitting means each for transmitting the history stored in an associated one of said plurality of distribution history storing means;

a single receiving means for receiving the histories transmitted from said plurality of transmitting means;

analyzing means for analyzing a distribution route based on the histories received by said single receiving means;

use sensing means for sensing use of information; and use history storing means for storing a history of the use of information sensed by said use sensing means.

8. The information tracing system as claimed in claim 7, further comprising:

an analysis result displaying means that displays the analysis result so that it is correlated with the history of the use of information stored in said use history storing means.

\* \* \* \* \*